US009011235B2

(12) United States Patent
Schwartz et al.

(10) Patent No.: US 9,011,235 B2
(45) Date of Patent: Apr. 21, 2015

(54) MULTI-OPPORTUNITY PLAY WITH OPTION TO FORFEIT ON A PLATFORM

(76) Inventors: Marc B. Schwartz, Longwood, FL (US); Gloria F. Mitchell, Longwood, FL (US)

( * ) Notice: Subject to any disclaimer, the term of this patent is extended or adjusted under 35 U.S.C. 154(b) by 2333 days.

(21) Appl. No.: 11/897,716

(22) Filed: Aug. 31, 2007

(65) Prior Publication Data

US 2008/0058099 A1 Mar. 6, 2008

Related U.S. Application Data

(60) Provisional application No. 60/842,636, filed on Sep. 6, 2006.

(51) Int. Cl.
*G06F 17/00* (2006.01)
*G06F 19/00* (2011.01)
*G07F 17/32* (2006.01)

(52) U.S. Cl.
CPC ............ *G07F 17/32* (2013.01); *G07F 17/3244* (2013.01); *G07F 17/3262* (2013.01); *G07F 17/3267* (2013.01)

(58) Field of Classification Search
USPC .................................................. 463/9–20, 25
See application file for complete search history.

(56) References Cited

U.S. PATENT DOCUMENTS 5,042,818 A * 8/1991 Weingardt ...................... 463/13
5,855,514 A * 1/1999 Kamille .......................... 463/17
5,996,997 A * 12/1999 Kamille ........................ 273/139
5,997,401 A * 12/1999 Crawford ........................ 463/20
6,102,798 A 8/2000 Bennett ........................... 463/16
6,113,493 A * 9/2000 Walker et al. ................... 463/25
6,261,177 B1 7/2001 Bennett ........................... 463/16
6,309,300 B1 * 10/2001 Glavich .......................... 463/26
6,311,976 B1 * 11/2001 Yoseloff et al. ............ 273/138.2
6,346,043 B1 * 2/2002 Colin et al. ..................... 463/17
6,439,995 B1 * 8/2002 Hughs-Baird et al. .......... 463/20
6,506,118 B1 * 1/2003 Baerlocher et al. ............. 463/25
6,511,375 B1 * 1/2003 Kaminkow ..................... 463/20
6,514,141 B1 * 2/2003 Kaminkow et al. ............. 463/25
6,572,471 B1 6/2003 Bennett ........................... 463/16
6,595,854 B2 * 7/2003 Hughs-Baird et al. .......... 463/20
6,602,137 B2 8/2003 Kaminkow et al. ............. 463/16
6,632,140 B2 10/2003 Berman et al. .................. 463/18
6,632,141 B2 * 10/2003 Webb et al. ..................... 463/25
6,648,754 B2 * 11/2003 Baerlocher et al. ............. 463/17
6,719,632 B2 * 4/2004 Palmer et al. ................... 463/25
6,722,981 B2 * 4/2004 Kaminkow et al. ............. 463/25
6,722,982 B2 4/2004 Kaminkow et al. ............. 463/25
6,780,107 B2 8/2004 Baerlocher et al. ............. 463/16

(Continued)

*Primary Examiner* — Steven J Hylinski

(74) *Attorney, Agent, or Firm* — Mark A. Litman & Associates, P.A.

(57) ABSTRACT

A multi-opportunity, risk vs. reward, playfield-style gaming platform grants players the ability to evaluate gaming situations and decide whether to risk current assets for greater rewards throughout the course of a game. Players have multiple opportunities to make risk versus reward decisions that ultimately affect the financial outcome of game play. Positive impact squares, negative impact squares and indifferent impact squares are assigned to the game playfield though the software platform based upon manufacturer and casino specified odds for each "Coin-In" credit level and value of game play. A status and information area legend is updated through the software platform and reports important game play information to players, allowing them to make more informed decisions throughout the course of their gaming experience.

11 Claims, 2 Drawing Sheets

(56) References Cited

U.S. PATENT DOCUMENTS

| | | | | |
|---|---|---|---|---|
| 6,793,579 | B2 * | 9/2004 | Baerlocher et al. | 463/25 |
| 6,796,899 | B2 * | 9/2004 | Baerlocher | 463/16 |
| 6,802,775 | B2 * | 10/2004 | Baerlocher et al. | 463/16 |
| 6,899,620 | B2 | 5/2005 | Kaminkow et al. | 463/16 |
| 6,939,224 | B2 * | 9/2005 | Palmer et al. | 463/16 |
| 6,958,013 | B2 | 10/2005 | Miereau et al. | 463/16 |
| 7,004,834 | B2 | 2/2006 | Walker et al. | 463/16 |
| 7,004,835 | B2 * | 2/2006 | Baerlocher | 463/16 |
| 7,040,984 | B2 * | 5/2006 | Mead | 463/16 |
| 7,160,188 | B2 | 1/2007 | Kaminkow et al. | 463/20 |
| 7,192,349 | B2 * | 3/2007 | Baerlocher et al. | 463/25 |
| 7,220,180 | B2 * | 5/2007 | Kaminkow et al. | 463/16 |
| 7,252,590 | B2 * | 8/2007 | Palmer et al. | 463/16 |
| 7,273,415 | B2 * | 9/2007 | Cregan et al. | 463/25 |
| 7,297,057 | B2 * | 11/2007 | Gerrard et al. | 463/13 |
| 7,314,409 | B2 * | 1/2008 | Maya et al. | 463/16 |
| 7,338,371 | B2 * | 3/2008 | Cheng et al. | 463/25 |
| 7,393,279 | B2 * | 7/2008 | Walker et al. | 463/25 |
| 7,416,486 | B2 * | 8/2008 | Walker et al. | 463/25 |
| 7,470,186 | B2 * | 12/2008 | Cannon | 463/18 |
| 7,607,978 | B2 * | 10/2009 | Palmer et al. | 463/16 |
| 7,771,273 | B2 * | 8/2010 | Walker et al. | 463/25 |
| 2003/0045344 | A1 * | 3/2003 | Webb et al. | 463/20 |
| 2003/0176215 | A1 * | 9/2003 | Palmer et al. | 463/25 |
| 2005/0282610 | A1 * | 12/2005 | Palmer et al. | 463/16 |
| 2006/0030401 | A1 * | 2/2006 | Mead et al. | 463/22 |
| 2006/0128461 | A1 * | 6/2006 | Okada | 463/25 |
| 2007/0004510 | A1 * | 1/2007 | Underdahl et al. | 463/29 |
| 2007/0270204 | A1 * | 11/2007 | Palmer et al. | 463/16 |
| 2010/0075745 | A1 * | 3/2010 | Gomez et al. | 463/25 |

* cited by examiner

FIG. 2

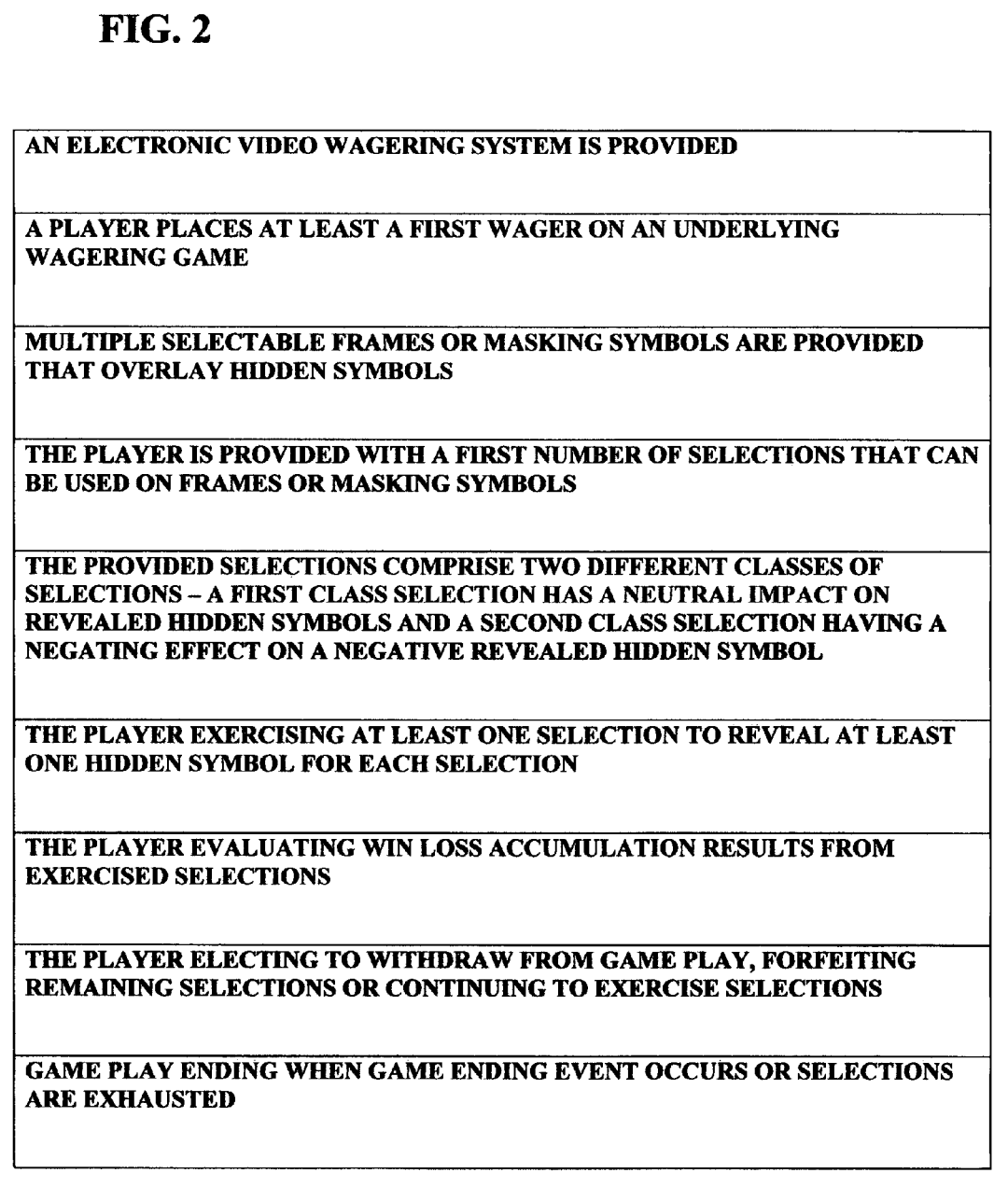

AN ELECTRONIC VIDEO WAGERING SYSTEM IS PROVIDED

A PLAYER PLACES AT LEAST A FIRST WAGER ON AN UNDERLYING WAGERING GAME

MULTIPLE SELECTABLE FRAMES OR MASKING SYMBOLS ARE PROVIDED THAT OVERLAY HIDDEN SYMBOLS

THE PLAYER IS PROVIDED WITH A FIRST NUMBER OF SELECTIONS THAT CAN BE USED ON FRAMES OR MASKING SYMBOLS

THE PROVIDED SELECTIONS COMPRISE TWO DIFFERENT CLASSES OF SELECTIONS – A FIRST CLASS SELECTION HAS A NEUTRAL IMPACT ON REVEALED HIDDEN SYMBOLS AND A SECOND CLASS SELECTION HAVING A NEGATING EFFECT ON A NEGATIVE REVEALED HIDDEN SYMBOL

THE PLAYER EXERCISING AT LEAST ONE SELECTION TO REVEAL AT LEAST ONE HIDDEN SYMBOL FOR EACH SELECTION

THE PLAYER EVALUATING WIN LOSS ACCUMULATION RESULTS FROM EXERCISED SELECTIONS

THE PLAYER ELECTING TO WITHDRAW FROM GAME PLAY, FORFEITING REMAINING SELECTIONS OR CONTINUING TO EXERCISE SELECTIONS

GAME PLAY ENDING WHEN GAME ENDING EVENT OCCURS OR SELECTIONS ARE EXHAUSTED

MULTI-OPPORTUNITY PLAY WITH OPTION TO FORFEIT ON A PLATFORM

RELATED APPLICATION DATA

This application claims priority from U.S. Provisional Application 60/842,636, filed Sep. 6, 2006.

BACKGROUND OF THE INVENTION

1. Field of the Invention

The present invention relates generally to electronic casino games or networked games and more specifically it relates to a multi-opportunity, risk vs. reward, playfield-style gaming platform for creating a new style of video-based casino game that delivers a more thrilling and entertaining gaming experience to players by granting them the ability to evaluate their situation and decide whether to risk current assets for greater rewards throughout the course of the game, and as a result of this new gaming concept, generate significantly greater returns to casinos.

2. Background of the Art

Electronic casino games have been in use for years. Typically, electronic casino games are mechanical and/or video-based forms of casino gaming devices such as slot machines, video poker, and multi-line video slot machines employing a Random Number Generator (RNG) for the purpose of determining random events that determine winning versus losing outcomes.

A problem with conventional electronic casino games is that knowledgeable players understand that the RNG will immediately determine the outcome of the game, and that outcome is completely determined by the processor executing the RNG algorithm. Although video poker allows for some variance in outcome since it is based on a "virtually shuffled" deck of 52 cards, there are a limited number of winning outcomes that can be attained after the first five cards have been electronically "dealt" to the player with only a maximum of five additional cards to be used as replacements. Another problem with conventional electronic casino games is the majority of video-based casino gaming devices are merely variations of two standard software gaming platforms—video poker and multi-line video slots. While there are a large variety of styles of each gaming platform, the game play is always basically the same, and both platforms have become stale over time, requiring game manufacturers to pay costly royalties to obtain licensed celebrity, movie and game show themes in order to maintain player interest.

Another problem with conventional electronic casino games is that current video-based casino gaming technology offers players very few choices and opportunities to influence and control the outcome of their game play, or even to give an appearance to actual player input. Mechanical and multi-line video slots typically only allow the player to select the number of pay lines and credits per line to bet. After these selections are made, the player has either won or lost. Video poker typically offers the player only a single opportunity to influence game outcome by discarding up to five cards from their hand.

While these devices may be suitable for the particular play events, they are not as suitable for creating a new style of video-based casino game that delivers a more thrilling and entertaining gaming experience to players by granting them the ability to evaluate their situation and decide whether to risk current assets for greater rewards throughout the course of the game, and as a result of this new gaming concept, generate significantly greater returns to casinos. Mechanical and multi-line video slots typically only allow the player to select the number of pay lines and credits per line to bet. After these selections are made, the player has either won or lost. Video poker typically offers the player only a single opportunity to influence game outcome by discarding up to five cards from their hand.

Certain games, especially in bonus rounds, have provided what are referred to in the art as "pick-and-reveal" games in which a limited number (X) of hidden symbols are provided and a number of selections or picks (fewer than X) are provided. The player exhausts the fewer than X picks to reveal some, but not all, hidden symbols.

U.S. Pat. Nos. 6,102,798 and 6,572,471 (Bennett) describes a slot machine including a prize display, a coin entry slot, a payout tray and internally mounted game control processor circuits. The game display means comprises a video display screen controlled to display a game image divided into a matrix of elements or player selectable zones. The video screen is preferably of the touch sensitive variety, having an array of touch sensitive areas located on its display surface with one such area associated with each matrix element. The player may select one of the matrix elements by touching the screen within the area of the respective element to be selected, thereby causing the image in the element to change to reveal whether or not a prize value is associated with that zone.

U.S. Pat. No. 6,261,177 (Bennett) describes a slot machine that includes a prize display, a coin entry slot, and payout tray and internally mounted game control processor circuits. The game display means comprises a video display screen controlled to display a game image divided into a matrix of elements or player selectable zones. The video screen has an array of touch sensitive areas located on its display surface with one such area associated with each matrix element. The control processor causes an image to be displayed on the display means, such as a sportsman playing his sport and randomly selects one or more of the matrix elements to have a prize associated with it. The player selects one of the matrix elements to have a prize by touching the screen within the area of the respective element to be selected, thereby causing the image in the element to change to reveal the associated prize value. Additional player controls are implemented by displaying images corresponding to controls on the screen such that when the control images are touched, the associated function is caused to be performed. In the event that the player wins the game, by selecting a zone having associated prize value, the machine will pay him a prize equivalent to the prize value in the zone selected by the player multiplied by the number of units bet.

U.S. Pat. Nos. 7,160,188; 6,602,137; and 6,899,620 (Kaminkow et al.) describes a gaming device having a multiple selection and award distribution bonus scheme. A selection is chosen from a group of selections. The game determines awards for distribution to the selection. Once determined, the awards are distributed to the selection and a player is provided with the awards. The game preferably utilizes a number of award pools in order to determine the award distribution. This award pool determination is based on, for example, a number of probability tables associated with the award pools.

U.S. Pat. No. 7,004,834 (Walker et al.) describes systems and methods facilitating play of a game with user-selected elements. According to one or more embodiments of the present invention, a set of all possible elements of a game is determined. Each of the elements of the set is associated with at least one of a plurality of locations. A representation of the plurality of locations is displayed to a player, defining a set of selectable locations. At least one selection signal is received, with each selection signal indicating a selectable location from the set of selectable locations, indicating at least one selected element. An outcome is determined based on at least one selected element.

U.S. Pat. No. 6,958,013 (Mireau et al.) describes a gaming device and method which includes a plurality of reels having multiple symbols on the reels. The symbols include at least one activator symbol. In one embodiment, if the player obtains an activator symbol on the reels, the activator symbol activates the symbols that are adjacent to the activator symbol. Activating the adjacent symbols reveals the awards associated with the adjacent symbols. The player receives an award that equals the activator symbol award plus the awards associated with each symbol that is adjacent to the activator symbol.

U.S. Pat. No. 6,780,107 (Baerlocher et al.) describes a gaming device and method having a pick reduction game. Initially, a plurality of first selections is displayed to the player. Also, a number of picks is displayed to the player where the number of picks is greater than the number of first selections. The player uses the number of picks to pick first selections until the player picks a trigger selection. The number of picks is reduced after each pick by the player. When the player picks the trigger selection, the gaming device displays a plurality of second selections to the player. Each of the second selections is associated with an award. The player picks second selections and receives awards for each picked second selection until there are no picks remaining.

U.S. Pat. No. 6,632,140 describes a system and method for facilitating participation by a player in a bonus event of a slot machine. A display grid associated with the slot machine is presented, where the display grid includes a plurality of active display segments. Symbols are presented in each of the active display segments, such as by randomly selecting symbols and displaying a randomly selected symbol in each of the active display segments. At least some of the symbols are discontinue symbols which, if presented in a display segment, causes that display segment to be deactivated, thereby eliminating that display segment from the bonus event. The presentation of symbols and subsequent deactivation of symbols associated with discontinue symbols continues until all of the active display segments have been deactivated.

U.S. Pat. No. 6,722,982 (Kaminkow et al.) describes a gaming device that provides a player with an opportunity to maximize a gaming device award. The gaming device presents the player with a display having a plurality of symbols and enables the player to choose one or more of the symbols. The game reveals the award(s) associated with the selected symbols but does not reveal which awards are associated with which symbols. The game then provides the player with one or more opportunities to upgrade the total award by deselecting one or more of the selected symbols and re-selecting another symbol for each deselected symbol.

SUMMARY OF THE INVENTION

A symbol display, pick and select wagering game provides a field of selectable areas, zones, symbols, frames or positions to a player (collectively referred to as frames). Hidden symbols are revealed upon player selection of frames, the hidden symbols having the possibility of positive credit effects, potential positive credit impact, negative credit impact, partial negative credit impact and/or neutral credit impact. The player is awarded different categories of selection choices that have different effects upon the impact of symbols revealed. A preferred potential of different impacts would be a SAFE selection, which would neutralize, moderate or reduce any negative or potential negative symbol selected, and a RISK selection that would not alter the impact of any symbol selected.

Upon placing a wager at risk, the system will provide the player with a number of selections to exercise on the available frames to expose symbols. The selections are provided with a combination of selections having at least two different properties, such as the SAFE selection and the RISK selection. The player then exercises the selections in a controlled manner, with the player being allowed to decline use of remaining selections (intuitively only declining use of RISK selections) so that any accumulated awards are retained without placing those awards or wagered value at risk in further selections.

BRIEF DESCRIPTION OF THE DRAWINGS

The present invention provides a new multi-opportunity, risk vs. reward, playfield-style gaming platform construction wherein the same can be utilized for creating a new style of video-based casino game that delivers a more thrilling and entertaining gaming experience to players by granting them the ability to evaluate their situation and decide whether to risk current assets for greater rewards throughout the course of the game, and as a result of this new gaming concept, generate significantly greater returns to casinos.

Various other objects, features and attendant advantages of the present invention will become fully appreciated as the same becomes better understood when considered in conjunction with the accompanying drawings, in which like reference characters designate the same or similar parts throughout the several views, and wherein:

FIG. 2 is a flow chart for play of one embodiment of the present technology.

DETAILED DESCRIPTION OF THE INVENTION

Figure 1:
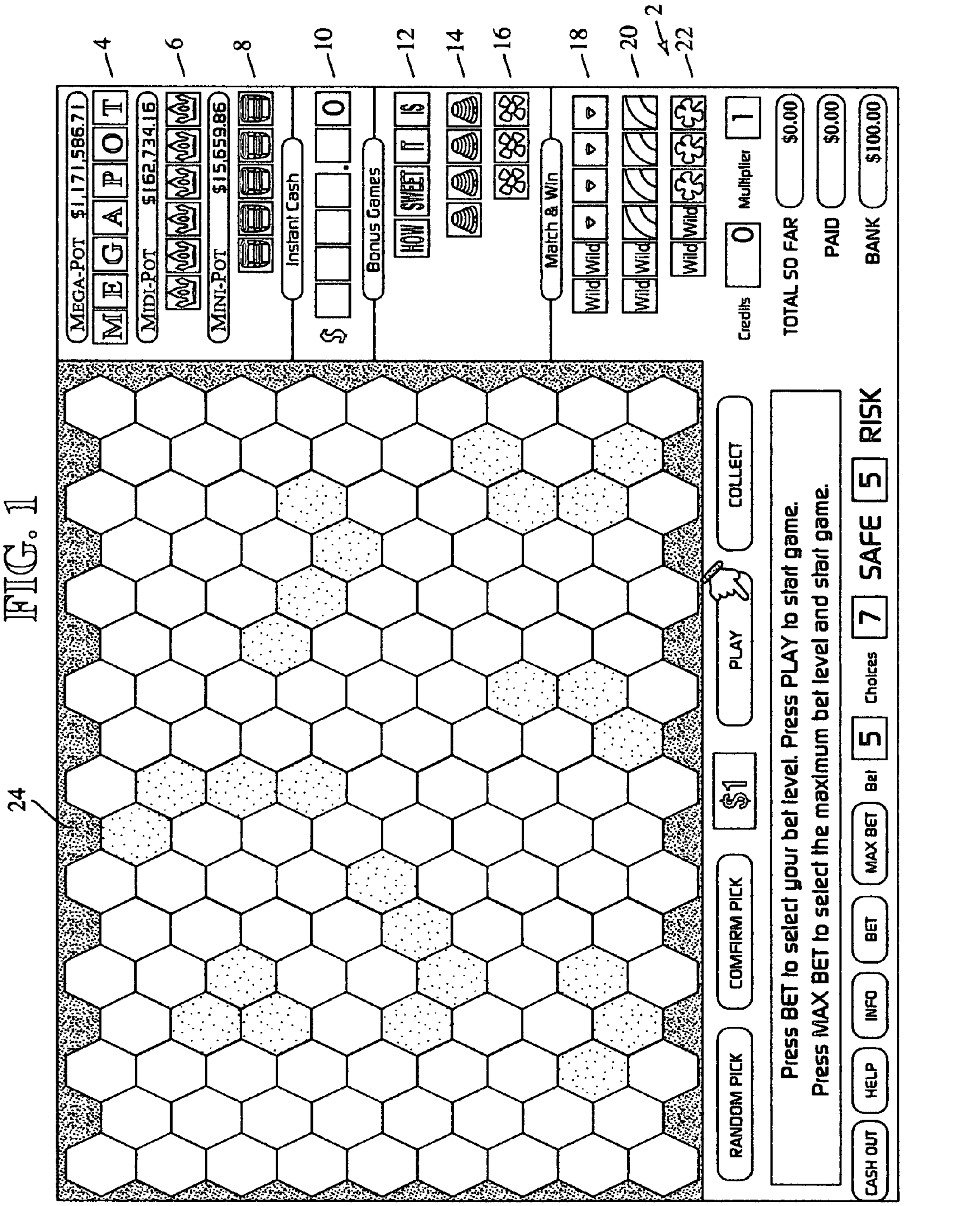
FIG. 1 is a front view sample screen of the gaming platform employing the "Liquid Gold" theme.

There are numerous aspects of the disclosed technology that constitute inventions that are novel, unobvious and establish inventive steps over prior art. Among the types of inventions described herein are gaming apparatus, game rules, betting procedures, game attributes, methods of playing games, and the like. The following description provides enabling disclosure of the various technologies supporting the inventions described herein.

A symbol display, pick and select wagering game provides a field of selectable areas, zones, symbols, frames or positions to a player (collectively referred to as frames). In a pick-and-reveal wagering game, events are usually played by providing a field of selectable locations, the player selects a limited or defined number of individual selectable locations until an event ending triggering selection occurs, and any accumulated awards are paid to the player. The selectable locations may be provided in any convenient manner and in any themed manner desired by a designer. For example, columns and rows of squares may be provided, a honeycomb array of spaces, sections of a puzzle, randomly distributed spaces or objects, letters in a phrase or story, masking symbols, or any other manner of identifying a selectable location under which a symbol is hidden. Hidden symbols (symbols which are virtually positioned under selectable areas) are revealed upon player selection of frame locations, the hidden symbols having the possibility of positive credit effects, potential positive credit impact, negative credit impact, partial negative credit impact and/or neutral credit impact. The player is awarded at least two different categories of selection choices that have different effects upon the impact of symbols revealed. A preferred potential of different impacts would be a SAFE selection, which would neutralize, reduce, or moderate any negative or potential negative symbol selected, and a RISK selection that would not alter the impact of any symbol selected.

The effect of the different formats of selections can vary and need not be limited to two properties only. For example, the SAFE selection may nullify an entire adverse effect of a selection (e.g., a loss of all wagers) or may merely reduce the impact of an adverse selection (e.g., a symbol indicating a loss of all wagers would be reduced to only a loss of or reduction of a portion of the wagers, such as a loss of 1× wagered unit, or a loss of a specific percentage or proportion of an initial wager or the winnings accumulated at the time of selecting a negative event with a SAFE wager with the other units remaining in play). Alternatively, if a selection made under a SAFE selection would ordinarily end the game (with or without attendant loss of all or a portion of initial wagers or accumulated winnings), selection under a SAFE choice could result in only a loss of a RISK selection or a SAFE selection, still allowing some possibility of a winning event to occur. These are some of the ways in which house hold percentages can be varied as well as varying formats of game play.

A non-limiting list of negative effects and possible impacts with SAFE selections might be described in accordance with the following table. The RISK selections would have no impact on the negative effects, so they are not listed in the table.

| NEGATIVE IMPACT OF SYMBOL | POSSIBLE EFFECTS OF SAFE SELECTION |
|---|---|
| Loss of all accumulated winnings | 1. No loss of winnings.<br>2. Reduction of loss to a specific portion<br>3. Reduction of loss to absolute amount<br>4. Reduction of loss to initial wager<br>5. Loss of winnings but with an additional SAFE selection(s) added<br>6. Player option among moderating effects |
| Loss of selection(s) | 1. No loss of a selection(s)<br>2. Loss of fewer selection(s)<br>3. Conversion of SAFE selection(s) to RISK selection(s)<br>4. Loss of a portion of initial wager and/or accumulated winnings<br>5. Player option among moderating effects |
| End of Game | 1. No immediate end of game<br>2. Loss of selection(s)<br>3. Loss of a portion of initial wager and/or accumulated winnings<br>4. Player option among moderating effects |
| Loss of Absolute Amount | 1. No loss of amount<br>2. Reduction of loss to a specific portion<br>3. Reduction of loss to smaller absolute amount<br>4. Reduction of loss to initial wager or portion thereof<br>5. Loss of amount but with an additional SAFE selection(s) added<br>6. Player option among moderating effects |
| Any Other Negative Effect | 1. No negative effect<br>2. Reduced negative effect |

The award of the various types of selections may be performed according to various game play rules. For example, the number of selections and the distributions among the types of selections may be wager dependent or fixed according to game rules. An example of fixed provision of selections would be that in every initial game to be played, upon placing an initial wager amount (X) at risk, the player will be given a fixed number of selections, such as five (5) selections, two of which are SAFE selections and three of which are RISK selections. The amount of any final award to the player will be the result of symbols revealed multiplied by the wager amount (usually as a multiple of minimum wagers allowed). For example, if during play of a selection game, the player successfully picks an award totaling three (3), the win would be 3×, three times the amount wagered. If the player makes a wager of 1, 2, 3, 4 or 5 times the minimum allowed wager, the selections would still be two SAFE selections and three RISK selections in a fixed format.

In a wager-based provision format of selections, the number and type of selections may depend upon the size or frequency of wagers. For example, five selections may be offered for 1×, 2×, 3×, 4× and 5× wagers, but there could be no SAFE selections (or 1 SAFE selection) for 1×, only 1× SAFE selection for 1× and 2× wagers, exactly two SAFE selections for 3× and 4× wagers, and three SAFE selections for a 5× wager. Alternatively, five selections may be offered for 1×, 2×, 3×, and 4× wagers, but there could be no SAFE selections (or 1 SAFE selection) for 1×, only 1× SAFE selection for 1× and 2× wagers, exactly two SAFE selections for 3×, 4× and 5× wagers, and there would be a total of six selections provided with a 5× wager. There might alternatively be three SAFE selections and six selections total available with a 5× wager.

There may be a number of different formats for exercising the selections by the player. A fast method of exercise would be for the player being required to select or the processor automatically selecting all SAFE wagers as a first step in the selection process. This would assure that a first selection (if any SAFE selections are available) could not be a losing selection or game ending selection. After all SAFE selections have been made, the player can look at the preliminary results and determine if existing amounts of value shall be placed at risk or if additional amounts shall be placed at risk. For example, if with a wager of 5× the first two SAFE exposures produce a result of plus-two (+2) as an award or as a return of the 5× and an add-on of +2, the player may elect to keep the 7× result and not place that win event at further risk. If the first two disclosed symbols are two parts of a jackpot event, with no winnings achieved at that point (e.g., the letters B and O are exposed and the jackpot is awarded for exposure of B-O-N-U-S), the player would likely continue with the game, as withdrawing (not exercising the additional available selections) would cause no more harm (the loss of the 5× wager) than continuing with the play of the game.

The amount and distribution of selections may also be a carryover award from a previous game. For example, in an earlier game an award or a partial award may be an indication to the player that in the next game played, the player will receive three SAFE picks and three RISK picks with any wager. This would encourage maximum wagers on those occasions. The game rules may provide that such bonus or award selection picks can only be won with maximum wagers or can be played with only maximum wagers. The award could also be in the form that with the next game played, the distribution of selections will shift to one more SAFE selection than is typically provided in a game. For example, if 1× receives no SAFE selections during normal play, the next play will provide for one SAFE selection with a 1× wager. Similarly, if a 2× and 3× wager receives only a single SAFE wager, the next play after the bonus award would provide the player with two SAFE selections, etc.

The exercise of the selections and the order of exercise of the selections may be more specifically controlled by the player. For example, it was described above that the SAFE selections could be exercised first by the processor or the player. Instead, the player may select whether the SAFE selection(s) will be exercised in any step of the game or if the RISK selections will be exercised at any step in the selection steps of the game. For example, if the player wagers 5× as the initial wager and receives 2 SAFE selections and 3 RISK selections, the player may choose which type of selection will be exercised in the next step, exercise that specific selection type, and then select what type of selection format will be used in the next selection step. The player may elect to stop exercising selections at any time, but the player is committed to placing the original wager amount at risk and can collect only accumulated awards at that stage of the game. For example, if the player has been initially given 2 SAFE selections and 3 RISK selections, the existing status of awards might well determine how the player will proceed. If the player has neither won nor lost any value after using two SAFE selections and two RISK, the player would elect to proceed as the original wager would be lost with a withdrawal (failure to exercise the remaining RISK selection) and there may be no opportunity for the player to lose any more than the original wager with any further play of the game. If the player has accumulated an award at that stage, the player would consider the risk versus potential value of going forward with the next selection. For example, if the player has already won twice the initial wager, and additional selections are unlikely to further improve the winnings, but there are negative impact symbols available that could cause a loss of the winnings at that point, the player might elect to withdraw and take the winnings. There might be an incentive or disincentive in the game rules against not exercising available selections. For example, if a player has a winning amount due after four selections (with one RISK selection remaining), and the initial wager was 5×, failure to exercise the remaining selection may incur a penalty of 1× or provide an award of 1×.

In events or rounds of play where a last remaining selection (s) is a SAFE selection, there would never be any reason for the player failing to exercise the SAFE selection as a worst case scenario would be a neutral result. As indicated earlier, the player may choose the order of exercise of the selections. The player may choose to use RISK selections first, assuming that there are a higher number of favorable symbols and neutral symbols available during a first pick and then exercise the SAFE selections later. In game play where only SAFE selections remain and the exposed symbols are not likely to provide a winning result, the player may be offered an incentive to turn-in and not exercise the SAFE selections, such as returning 1× out of the 5× wager for each SAFE wager that is not used. This minimizes losses for the player and assures a win for the casino. This type of play might be used where the first three selections produce neutral results and the likelihood of a positive result (seldom awarded for a single exposed symbol) are slight.

The distribution of the symbols in the selectable frames or positions may be handled in a number of different formats. The spacing may be in various geometric distributions, hypergeometric distributions, shapes, patterns and the like. One format is to have the processor distribute the positive, negative and neutral symbols randomly on the array in advance of the player making any actual selections. The distribution would be random and the player would not have any indication of the location of individual symbols, so the game play would be random, but if informed of the predetermined location of symbols, the player might be inclined to feel that some exercise of logic on the selection would be a result of expertise or luck in which the player's action have some effect rather than the processor completely determining events, even if that processor determination is random as required by law.

Alternatively, the processor randomly can determine in which order symbols will be selected, without regard to which frames are selected and in what order. In the circumstance where the player may exercise judgment in the choice of which type of selection (SAFE or RISK) is to be used in each turn, the player might still believe that player actions are affecting results.

A gaming apparatus useful in the practice of the various technologies and constituting an aspect of these inventions comprises a processor, player input controls, a video display and game control software in which the video display provides selectable areas, player input controls allow selection of individual selectable areas by the player and the processor providing the player with a limited number of selections, and within selectable areas are hidden symbols that provide at least some positive outcome effects when selected or negative outcome effects when selected, wherein the processor provides at least two classes of selections that have different effects on selection of a single class of negative outcome effects.

The electronic gaming machine suitable for use with an embodiment of the present invention may include a display and a number of input buttons, or touch screen functions to enable the player to initiate actions or make responses as required during the game. In a game where the player is playing against the house, the player's hand is displayed face up on the screen as it is dealt and the house hand is shown face down on the screen. Touch "buttons" can be provided on the screen in addition to or instead of the physical buttons. In a further non-limiting configuration, one or more of the players can be located in separate locations, and the player terminals or hand-held devices or player screens in rooms can be connected to the controller via communication links (e.g., hard-wired or wireless). Standard protocols, software, hardware and processor languages may be used in these communication links, without any known limitation. There are hundreds of available computer languages that may be used, among the more common being Ada; Algol; APL; awk; Basic; C; C++; Cobol; Delphi; Eiffel; Euphoria; Flash; Forth; Fortran; HTML; Icon; Java; Javascript; Lisp; Logo; Mathematica; MatLab; Miranda; Modula-2; Oberon; Pascal; Perl; PL/I; Prolog; Python; Rexx; SAS; Scheme; sed; Simula; Smalltalk; Snobol; SQL; Visual Basic; Visual C++; and XML.

Any commercial processor may be used either as a single processor, serial or parallel set of processors in the system. Examples of commercial processors include, but are not limited to Merced™, Pentium™, Pentium II™, Pentium III™, Pentium 4™, Pentium D™, Pentium M™, Centrino™, Core 2™ Duo, Core 2™ Quad, Dual Core™, Extreme Edition™, Itanium™, VIIV™, Xeon™, Celeron™, Pentium Pro™, Efficeon™, Athlon, AMD, Sempron™, Turion™ 64, Opteron™, X2 Dual-Core, Quad-Core, Multi-Core, and the like.

Display screens may include but are not limited to: segment display screens, analog display screens, digital display screens, CRTs, LED screens, Plasma screens, liquid crystal diode screens, and the like.

It is also a possible format of play within the generic concepts of the present technology that when a player has exhausted all selections, the player may elect to pay an additional non-wager amount to continue with one or more additional selections. For example, if a player has made five selections without a game terminating event occurring (e.g., a catastrophic loss of all wager and awards event) and has a potential for a large win (e.g., having selected B-O-N-U), the system would allow the player to purchase additional selections (either RISK selections or combinations of RISK and SAFE selections). The quantity of selections that may be further purchased may be limited and the type of selections that may be purchased may be limited. For example, with an initial wager of 5×, the player may be able to purchase two (2) more selections for an additional 5×, and those selections may be limited to two RISK selections or a RISK selection and a SAFE selection with the order of use of the additional selections being fixed or optional at the choice of the player. That is, if a SAFE and RISK selection are purchased, the RISK selection may be required to be used first, the SAFE selection may be required to be used first, or the player may choose which is to be used first.

Upon placing a wager at risk, the system will provide the player with a number of selections to exercise on the available frames to expose symbols. The selections are provided with a combination of selections having at least two different properties, such as the SAFE selection and the RISK selection. The player then exercises the selections in a controlled manner, with the player being allowed to decline use of remaining selections (intuitively only declining use of RISK selections) so that any accumulated awards are retained without placing those awards or wagered value at risk in further selections.

The present invention provides a multi-opportunity, risk vs. reward, playfield-style gaming platform on a communal, networked or standalone video-based casino gaming software platform that incorporates a unique playfield-style design offering players multiple opportunities to make risk versus reward decisions that ultimately affect the outcome of game play. The game is referred to as "risk-versus-reward" because the player may have attained a level of award at some stage of play, and in seeking to attain a larger award, places existing winnings at risk in making further selection. The platform can be customized with various gaming themes and casino specified odds, payout ranges, and prizes. The software platform controls all functions of the game including the player interface, which allows the player to interact with the game, the gaming engine, which controls how the game plays out based upon player input, and the management interface, which allows the game manufacturer and casinos to customize various parameters of the game, employ security and game tracking measures, and access various reporting features. The player interface (e.g., touch screen function, button function, mouse function, joy-stick function, keyboard function, monitor, wireless communication device such as a PDA or mobile phone and the like), gaming engine (processor, game controller, rules sets, Random Number Generator, image files and the like), and management interface (I/O interface, database, security interface, credit management, comp management, and the like) are not necessarily individual components, but rather may be functions of the software platform as a whole on one or more processors. Since player and management interfaces are relatively standardized throughout the video-based casino gaming industry, the software platform component description will concentrate on the unique, game play specific functions of the gaming engine. Positive impact squares are assigned to the game playfield through the software platform based upon manufacturer and casino specified odds for each "Coin-In" credit level and value of game play. Negative impact squares are assigned to the game playfield through the software platform based upon manufacturer and casino specified odds for each "Coin-In" credit level and value of game play. Indifferent squares are assigned to the game playfield through the software platform based upon manufacturer and casino specified odds for each "Coin-In" credit level and value of game play. The status and information area (which may for example include any or all of at least credit status, game status, selection status, jackpot status, probability status on specific potential game outcomes, HELP functions and the like) legend is updated through the software platform and reports important game play information to players, thereby allowing them to make more informed decisions throughout the course of their gaming experience. Game themes may comprise graphics, sound effects, animations, multi-media presentations and physical displays which may be applied to the software platform and areas surrounding the game to attract players, maintain their interest, and provide a unique, fun-filled gaming experience.

The present technology may include a method of providing a wagering game on a video wagering system comprising a player placing value at risk in exchange for a first number of player usable selections. The selections comprise at least two categories of selections: A first category of selection having a first effect upon at least some selection results and a second category of selection having a second effect upon at least some selection results. The player exercises at least some but less than all selections of frames to reveal at least one symbol for each selection made. The symbols are able to provide a player with potentially positive award results, positive award results, potential negative results, negative results or neutral results; wherein at least the first effect of the first category of selection can at least reduce a negative effect or potential negative effect by at least some degree.

A potentially positive award result is a symbol that may be combined with other symbols to provide a specific award or value. A positive award result is an symbol that provides an immediate value to the player. A potential negative result is a symbol that may be combined with other symbols to provide a specific award loss or value reduction. A negative result is a symbol that immediately causes a loss of a specific amount, a specific value or an end to the game. A neutral result is a result that does not have an immediate or potential effect on value or awards, such as a blank frame.

The method may be practiced wherein a selection of a negative effect is made and the first effect nullifies the negative effect completely. The method may be practiced wherein a selection of a negative effect is made and the first effect reduces the negative effect by a fixed degree. The method may be practiced wherein after making at least one selection, the player may forfeit at least one additional wager. The method may be practiced wherein all first category of selections must be used before any of the second category of selections are exercised. The method may be practiced wherein the player may elect which category of selection to use on each selection. The method may be practiced wherein at any time during play, if a player has accumulated an award amount, the player may forfeit any remaining second category selections and retain all award amounts accumulated at that time. The method may be practiced wherein the second category of selections has no impact on any effects of selections. The method may be practiced wherein the player is given a number of selections fewer than a total number of frames from which selections may be made. The method may be practiced wherein there are at least five or at least ten frames from which selections may be made. The method may be practiced wherein there are at least 25 frames and the player receives at least two, three, four or five selections and at least one selection is a first category of selection and at least one selection is a second category selection. The method may be practiced wherein there are at least 10, 25, 50 and no more than 150, 250 or 1,000 frames which may be selected by a player.

It is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

The present invention grants players the ability to evaluate their situation and decide whether to risk current assets for greater rewards throughout the course of the game, and as a result of this new gaming concept, generate significantly greater returns to casinos.

Another method of game play is to provide a wagering game on a video wagering system comprising: a player placing value at risk in exchange for a first number of player usable selections; the selections comprising two categories of selections, a first category of selection having a first effect upon at least some selection results and a second category of selection having a second effect upon at least some selection results; the player exercising at least some but less than all player usable selections of frames to reveal at least one symbol for each selection made, symbols being able to provide a player with potentially positive award results, positive award results, potential negative results, negative results or neutral results; at least the first effect of the first category of selection can at least reduce a negative effect or potential negative effect by at least some degree; wherein the player makes an election to forfeit at least one player usable selection after having exercised at least some of the player usable selections, whether or not an award has been accumulated.

Still another method of providing a wagering game on a video wagering system comprises: a player placing value at risk in exchange for a first number of player usable selections; the selections comprising two categories of selections, a first category of selection having a first effect upon at least some selection results and a second category of selection having a second effect upon at least some selection results; the player exercising at least some but less than all selections of frames to reveal at least one symbol for each selection made, symbols being able to provide a player with potentially positive award results, positive award results, potential negative results, negative results or neutral results; wherein at least the first effect of the first category of selection can at least reduce a negative effect or potential negative effect by at least some degree; and after exercise of some player usable selections but before termination of the game, a player may make additional wagers to be provided with additional player usable selections, wherein at least some of the player usable selections are a second category of selection that does not at least reduce a negative effect or potential negative effect by at least some degree.

Still yet another method of providing a wagering game on a video wagering system comprises: a player placing value at risk in exchange for a first number of player usable selections; the selections comprising two categories of selections, a first category of selection having a first effect upon at least some selection results and a second category of selection having a second effect upon at least some selection results; the player exercising at least some but less than all selections of frames to reveal at least one symbol for each selection made, symbols being able to provide a player with potentially positive award results, positive award results, potential negative results, negative results or neutral results; at least some symbols being images of playing cards; wherein at least the first effect of the first category of selection can at least reduce a negative effect or potential negative effect by at least some degree. The selection of a negative effect may be made and the first effect allows replacement of a selected symbol after the symbol is revealed to the player. The selection of a negative effect may be made and the first effect may allow replacement of a selected symbol after the symbol is revealed to the player, but with an alteration in awards provided by a pay table for ranked poker hands. That is, even though the player has exercised a SAFE selection and replaces a disclosed symbol using that SAFE selection, there is a reduction in potential award amounts for given poker hands because of the additional benefits provided to the player. For example, if a pay table without replacement of cards has first awards, a pay table with replacement of cards may have some or all payments for higher ranked hands adjusted because of the more favorable player possibilities for ranked hands, as shown below.

| HAND RANK | NO REPLACEMENTS | ONE REPLACEEMENT |
|---|---|---|
| Royal Flush | 1000× Ante | 750× Ante |
| Straight Flush | 500× Ante | 400× Ante |
| Four-of-a-Kind | 150× Ante | 100× Ante |
| Full House | 40× Ante | 25× Ante |
| Flush | 7× Ante | 5× Ante |
| Straight | 5× Ante | 4× Ante |
| Three-of-a-Kind | 3× Ante | 2× Ante |
| Two Pair | 2× Ante | 2× Ante |
| Jacks or Better | 1× Ante | 1× Ante |

The multi-opportunity, risk vs. reward, playfield-style gaming platform may reveal the entire game playfield at the end of game play, thereby allowing players to know the exact location of every positive and negative impact square. Even though this revelation has no impact on future distributions, the display is of interest to players who are more inclined to believe that past events influence future probabilities, even though that is not the actuality of the performance of a processor.

This invention may be embodied in the form illustrated in the accompanying drawings, attention being called to the fact, however, that the drawings are illustrative only, and that changes may be made in the specific construction illustrated.

Referring now to the drawings, FIG. 1 generally illustrates a display screen on a gaming device 10 of one embodiment of the present invention, which is preferably a slot machine having the controls, displays and features of a conventional slot machine (which includes within the art any electronic or electromechanical gaming device such as video screens, mixed reels and video screens), such as credit control, credit input, player controls, processor, random number generation, game control, display screen, and optionally external communication capability such as to a central computer, communal screen, wireless player access and the like. Gaming device 10 is constructed so that a player can operate gaming device 10 while standing or sitting. However, it should be appreciated that gaming device 10 can be constructed as a pub-style table-top game (not shown) that a player can operate preferably while sitting or be part of a multiplayer platform or bank of gaming apparatus. Gaming device 10 can also be implemented as a program code stored in a detachable cartridge for operating a hand-held video game device or be provided as an internet service or game. Also, gaming device 10 can be implemented as a program code stored on a disk or other memory device which a player can use in a desktop or laptop personal computer or other computerized platform. Gaming device 10 can incorporate any game such as slot, poker, poker variants, blackjack, baccarat, pick-and-reveal symbol displays or keno. The symbols used on and in gaming device 10 may be in mechanical, electrical or video form or combinations of these.

As illustrated in FIG. 1, gaming device 10 includes a coin slot 12 and bill acceptor 14 where the player inserts money, coins or tokens. The player can place coins in the coin slot 12 or paper money in the bill acceptor 14. Other devices could be used for accepting payment such as readers or validators for credit cards or debit cards or the increasingly common ticket-in-ticket-out technology. When a player inserts money in gaming device 10, a number of credits corresponding to the amount deposited is shown in a credit display 16. The present invention preferably employs or uses credits, however, the present invention is not limited to the use of inserted credits and contemplates employing other units of value such as money or access to a player account in a central storage for player credit. For purposes of describing and claiming this invention, the term "credit" includes any unit of value such as a gaming device credit or actual money.

After depositing the appropriate amount of money or establishing credit to risk for a game, a player can begin the game by pulling arm 18 or by pushing play button 20, touching a touch screen wager function or by automated entry at time intervals or upon placing a maximum number of credits at risk for a game. Play button 20 can be any play activator used by the player which starts any game or sequence of events in the gaming device.

Referring to FIG. 1, gaming device 10 also includes a bet display 22 and a bet one button 24. The player places a bet by pushing the bet one button 24. The player can increase the bet by one credit each time the player pushes the bet one button 24. When the player pushes the bet one button 24 or after the bet button has been pressed and the actual game play begins, the number of credits shown in the credit display 16 decreases by one or the number of credits entered in the wager, as by depressing the single bet button multiple times or by depressing a maximum bet button, and the number of credits shown in the bet display 22 increases by one or the wagered amount.

Gaming device 10 also has a video display 28 which contains a plurality of frames 30, preferably at least four by six or three by five columns and rows (or any other number combinations, such as 10×12, 12×12, 12×30 and the like) in video form to display the masking symbols and then the player selects individual ones of the displayed masking symbols in the frames. Each frame 30 displays at least one symbols such as bells, hearts, martinis, fruits, cactuses, numbers, cigars, letters, bars, poker cards, letters, words or other images, which preferably correspond to a theme associated with the gaming device 10. If the collection of frames displayed are provided by reels or frames 30 preferably are in video form, the gaming device 10 preferably displays the video reels 30 in the display device. Furthermore, gaming device 10 preferably may include speakers 34 for making sounds or playing music.

A player may "cash out" and thereby receive a number of coins corresponding to the number of remaining credits by pushing a cash out button 26. When the player "cashes out," the player receives the coins in a coin payout tray 36. The gaming device 10 may employ other payout mechanisms such as credit slips redeemable by a cashier or electronically recordable cards that keep track of the player's credits.

With respect to electronics, the controller of gaming device 10 preferably includes the electronic configuration that may generally have a processor; a memory device for storing program code or other data; a display device (i.e., a liquid crystal display, CRT, flat screen, plasma screen, light-emitting diode, or any other image display); a plurality of speakers; and at least one input device. The processor is preferably a microprocessor or microcontroller-based platform that is capable of displaying images, symbols and other indicia such as images of people, characters, places, things and faces of cards. The memory device can include random access memory (RAM) for storing event data or other data generated or used during a particular game. The memory device can also include read only memory (ROM) for storing program code, which controls the gaming device 10 so that it plays a particular game in accordance with applicable game rules and pay tables.

The player preferably uses input devices, such as an arm, play button, the bet one button and the cash out button to input signals into gaming device 10. A touch screen and an associated touch screen controller are preferably used in conjunction with a display device described in detail below. Touch screen and touch screen controller are connected to a video controller and processor. A player can make decisions and input signals into the gaming device 10 by touching the touch screen at the appropriate places. The processor can be connected to coin slot or bill acceptor or any other credit device. The processor can be programmed to require a player to deposit a certain amount of money in order to start the game.

It should be appreciated that although a processor and memory device are preferable implementations of the present invention, the present invention can also be implemented using one or more application-specific integrated circuits (ASIC's), FPGAs (Field Programmable Gated Arrays) or other hard-wired devices, or using mechanical devices (collectively referred to herein as a "processor"). Furthermore, although the processor and memory device preferably reside on each gaming device 10 unit, it is possible to provide some or all of their functions at a central location such as a network server for communication to a playing station such as over a local area network (LAN), wide area network (WAN), Internet connection, microwave link, and the like. For purposes of describing the invention, the controller includes the processor and memory device.

Referring to FIG. 1, to operate the gaming device 10, the player must insert the appropriate amount of money or tokens at a coin slot or bill acceptor and then pull the arm or push the play button. The frames will then be available for selection. Eventually, at least some of the frames will be selected to expose symbols as part of the game. As long as the player has selections remaining, the player can select frames again. Depending upon what the frames reveal, the player may or may not win additional credits.

In addition to winning credits in this manner, gaming device 10 preferably may also give players the opportunity to win credits in a bonus round. This type of gaming device 10 will include a program that will automatically begin a bonus round when the player has achieved a qualifying condition in the game. This qualifying condition can be a particular arrangement of indicia on the display window. The gaming device 10 also includes a display device such as a display device shown in FIG. 1 enabling the player to play the bonus round. Preferably, the qualifying condition is a predetermined combination of indicia appearing on a plurality of frames such as those provided by reels 30. As illustrated in the three reel slot game shown in FIG. 1, the qualifying condition could be the text "BONUS!" appearing in the same location on three adjacent frames.

Turning now descriptively to the drawings, in which similar reference characters denote similar elements throughout the several views, the attached figures illustrate a multi-opportunity, risk vs. reward, playfield-style gaming platform, which comprises a standalone video-based casino gaming software platform that incorporates a unique playfield-style design offering players multiple opportunities to make risk versus reward decisions that ultimately affect the outcome of game play. The platform can be customized with various gaming themes and casino specified odds, payout ranges, and prizes. The software platform controls all functions of the game including the player interface, which allows the player to interact with the game, the gaming engine, which controls how the game plays out based upon player input, and the management interface, which allows the game manufacturer and casinos to customize various parameters of the game, employ security and game tracking measures, and access various reporting features. The player interface, gaming engine, and management interface are not individual components, but rather functions of the software platform as a whole. Since player and management interfaces are relatively standardized throughout the video-based casino gaming industry, the software platform component description will concentrate on the unique, game play specific functions of the gaming engine. Positive impact squares are assigned to the game playfield though the software platform based upon manufacturer and casino specified odds for each "Coin-In" credit level and value of game play. Negative impact squares are assigned to the game playfield though the software platform based upon manufacturer and casino specified odds for each "Coin-In" credit level and value of game play. Indifferent squares are assigned to the game playfield though the software platform based upon manufacturer and casino specified odds for each "Coin-In" credit level and value of game play. The status and information area legend is updated through the software platform and reports important game play information to players, thereby allowing them to make more informed decisions throughout the course of their gaming experience. Game themes consist of graphics, sound effects, animations, multimedia presentations and physical displays which may be applied to the software platform and areas surrounding the game to attract players, maintain their interest, and provide a unique, fun-filled gaming experience.

By using a SAFE choice, the symbol revealed by a SAFE choice, all effects of a negative impact square are neutralized. Once SAFE choices are gone, the player may collect existing payments or proceed with the exercise of RISK choices which place some or all of the accumulated awards at risk. Player can determine when to stop placing funds at risk.

The software platform controls all functions of the game including the player interface, which allows the player to interact with the game, the gaming engine, which controls how the game plays out based upon player input, and the management interface, which allows the game manufacturer and casinos to customize various parameters of the game, employ security and game tracking measures, and access various reporting features. The player interface, gaming engine, and management interface are not individual components, but rather functions of the software platform as a whole. Since player and management interfaces are relatively standardized throughout the video-based casino gaming industry, the software platform component description will concentrate on the unique, game play specific functions of the gaming engine. While the RNG remains a necessary component of slot machine and video-based casino gaming, it can be used in a different manner to produce a new style of casino game with far-reaching appeal. Consider the following promotional marketing concept: "Every Game Can Win!—The Choice Is Up To You . . . Feeling Lucky?" Players will soon discover that the RNG can be used to setup initial game play, rather than calculate a final outcome, thereby allowing players to be more in control of how their game play progresses. The software platform utilizes the RNG to populate the game playfield at the start of the game and manages player interaction, choices and outcomes. Software platform functions include establishing the layout of the game playfield, the level of player interaction based upon allocated credits, the population of the game playfield, and the management and execution of game play results. Casinos will experience new revenue streams backed by the security of programmable game play odds. Example Game Layout—For example, as illustrated in FIG. 1, the game may consist of a 10 by 12 "playfield area" grid, yielding 120 individual cells or squares. These squares are "marked" by the RNG at the beginning of game play to either remain empty or hold a specific content. The player is then instructed to select one square from the "playfield" of 120. Upon confirmation of the player's selection, the result of the square is revealed. Hence the "playfield is set" at the very beginning of the game and the results—positive, negative or indifferent—are determined entirely by the player's choices. Players are allowed to continue selecting squares based upon casino selectable values specified at each "Coin-In" credit level of play. In addition to the game playfield, as illustrated in FIG. 1, 2, is a status and information area displaying a legend of the available contents in the remaining unselected squares, the number of player selections remaining, and game play messages and confirmations. Example Game "Coin-In" Credit Levels of Play—While this game may be deployed using a variety of credit denominations, this example will employ a $1.00 credit value. Like most forms of mechanical and video-based casino games, multiple credits may be played to enhance possible outcomes. This example uses a 1-5 credit per play style familiar to Video Poker enthusiasts: 1 Credit-3 "protected" or SAFE selections followed by 1 optional "unprotected" or RISK selection(s); 2 Credits-4 "protected" or SAFE selections followed by 2 optional "unprotected" or RISK selections; 3 Credits-5 "protected" or SAFE selections followed by 3 optional "unprotected" or RISK selections; 4 Credits-6 "protected" or SAFE selections followed by 4 optional "unprotected" or RISK selections; and 5 Credits-7 "protected" or SAFE selections followed by 5 optional "unprotected" or RISK selections. The contents of a square may be positive, negative, or indifferent, however; when a player makes a "protected" or SAFE selection, the contents of negative impact squares are rendered inactive. Only when a player makes an "unprotected" or RISK selection can their game play be adversely affected. With each credit allocated to the game, increases in the number of positive impact squares and additional types of positive impact squares will be assigned to the playfield and reflected in the status and information area legend.

Positive impact squares are assigned to the game playfield though the software platform based upon manufacturer and casino specified odds for each "Coin-In" credit level and value of game play. Types or categories of positive impact squares contain benefits and/or awards which positively affect the outcome of game play for the player. The software platform will employ positive impact squares including: (I) Credit Squares, (II) Credit Match-Up Squares, (III) "WILD" Credit Match-Up Squares, (IV) Credit Multiplier Squares, (V) Spell-Out Squares in the forms of (A) Spell-Out Prize with Multiples of Component Squares, and (B) Spell-Out Prize with Single Component Squares with (1) W-I-N Feature, (2) G-A-M-E Feature, (3) B-O-N-U-S Feature, (4) J-A-C-K-P-O-T Feature, and (5) J-A-C-K-P-O-T with B-O-N-U-S Feature, (VI) Sequential Cash Award Squares, (VII) Instant Win Prize Award Squares, (VIII) Remove "Empties" Squares, and (IX) "Make Safe" Selection Squares. (I) Credit Squares—Contain a positive numerical value of game play credits to be added to the player's "credit bank" at the end of game play. This is an independent win square; meaning that additional squares are not required to be selected in order for the contents of the credit square to be awarded to the player. The value of credit squares range from one credit to the casino specified maximum. In this example game, credit square values will include 1, 2, 3, 4, 5, 10, and 25 credits. The quantity of each value of credit square and the total number of credit squares is established by the casino for each "Coin-In" credit level of play. (II) Credit Match-Up Squares—Contain a positive numerical value of game play credits to be added to the players "credit bank" at the end of game play, provided the player can match two or more of the same credit match-up squares. This is a dependent win square; meaning that in order for the player to collect the credits indicated in the square, two or more matching squares must be selected by the player before the end of game play. Values of credit match-up squares along with the number of matching squares required to award the value of the squares are specified by the casino. In this example game, credit match-up square values will include Match-25 (2 required, 4 available), Match-50 (2 req., 4 avail.), and a Tri-Match-100 (3 req., 3 avail.). If a player selects more than the required number of the same credit match-up square, the player will receive the same match-up value for each additional match-up square as a bonus. For example, if a player uncovers four Match-25 and 3 Match-50 credit match-up squares, the player will be awarded 25 credits for the 2 required Match-25 squares with a 50 credit bonus for the two additional Match-25 squares, and 50 credits for the 2 Match-50 squares with a 50 credit bonus for the one additional Match-50 square. The variety, value, number required, and number available of credit match-up squares is established by the casino for each "Coin-In" credit level of play. While credit match-up squares can and should be included on every "Coin-In" credit level of play, it is suggested that larger match-up values and extra matching squares be reserved for 3 "Coin-In" credit or higher levels of play. (III) "WILD" Credit Match-Up Squares—This square can match with any credit match-up square and will immediately take on the value of the first credit match-up square revealed. If a player has uncovered two or more different credit match-up squares prior to revealing the WILD match-up square, it will be matched with the highest value credit match-up square that produces a credit award. If a higher value credit match-up square is revealed, the WILD match-up square will change to match the higher value square as long as the match produces a credit award. For example, if a player has revealed one Match-25 and one Tri-Match-100 followed by a WILD-Match square, the WILD-Match square would pair with the Match-25, the highest value match-up square that produces a credit award. If the player then reveals one Match-50, the WILD-Match square would change value to pair with the Match-50. If the player then reveals another Tri-Match-100, the WILD-Match square would change value to match the two Tri-Match-100 squares to form the required 3 match-up squares necessary to award the match-up credit. The number of available "WILD" match-up squares is established by the casino for each "Coin-In" credit level of play. It is suggested that "WILD" match-up squares begin to appear on the 3 "Coin-In" credit level of play, with extra "WILD" match-up squares on 4-5 "Coin-In" credit levels of play. (IV) Credit Multiplier Squares—Contain a positive numerical value that acts as a multiplier to be applied to game play credits accumulated during the round at the end of game play. This is a dependent win square, meaning that credit squares and/or credit match-up squares meeting match-up requirements are required to be selected in order for the contents of the credit multiplier square to be awarded to the player. In essence, a credit multiplier square with no credits to multiply has no individual intrinsic value. Values of credit multiplier squares along with the number of available multiplier squares are specified by the casino. In this example game, credit multiplier square values will include Credits-×2 (with up to 3 Credit-×2, available). If a player selects one or more credit multiplier squares, the credit multiplier value is increased accordingly and applied to the total number of credits won from credit and/or credit match-up squares at the end of the game. For example, if a player uncovers two Credit-×2, a 5 credit, and two Match-25 squares, at the end of the round, 30 credits will be multiplied by 4 for a total of 120 credits won. The variety, value, and number of available of credit multiplier squares is established by the casino for each "Coin-In" credit level of play. It is suggested that credit multipliers begin to appear on the 2 "Coin-In" credit level of play, with larger and extra credit multiplier squares reserved for 3-5 "Coin-In" credit levels. (V) Spell-Out Squares—Contain portions of an easily identifiable word, phrase, abbreviation, acronym, etc. that requires the player to uncover all component squares before the end of the round in order to acquire the corresponding award. Spell-out squares are dependent win squares resulting in an all or nothing outcome and possess no individual intrinsic value. Spell-out squares typically range from 3 to 7 component squares in length and can be assigned values according to the "theme" and credit value of the game. Component squares are not interchangeable between prizes, for example, if two or more spell-out square prizes contain the letter "O", the component square for each is unique and marked accordingly with graphics indicating to which prize the component "O" belongs. To avoid confusion and build excitement, the legend will update an image of the prize as each component square is revealed. Some spell-out square prizes may have multiples of certain component squares, while others populate only a single square for each component. (A) Spell-Out Prize with Multiples of Component Squares—For example, the spell-out phrase "How Sweet It Is" is a 4-component square prize resulting in the award of a theme-specific prize (such as a gold bracelet), a casino-specified credit bonus, or a theme-specific bonus round. The components of the phrase are "How", "Sweet", "It" and "Is". During game play, two "How", one "Sweet", two "It", and two "Is" component squares may populate the field. Regardless of how many "How", "It", and "Is" components the player acquires, the single "Sweet" component is required to win. Every game, the components are randomized so only one becomes a single instance component while the remaining components are assigned to multiple squares. This keeps game play fresh as the player is unaware if they have revealed the single instance component square of the spell-out prize. (B) Spell-Out Prize with Single Component Squares—There are certain common words ideal for spell-out prizes, including certain auto manufacturers and models such as C-H-E-V-Y, D-O-D-G-E, C-A-M-R-Y, and H-U-M-M-E-R to name a few. Even T-R-I-P, T-R-U-C-K or J-E-T-S-K-I can be used for prizes at the casino's discretion based upon credit value and "Coin-In" level of play. There are several reserved spell-out prizes with single component squares that invoke additional "bonus rounds" of game play or a progressive payout. These terms are W-I-N, G-A-M-E, B-O-N-U-S, and J-A-C-K-P-O-T, which become available at the 2nd, 3rd, 4th, and 5th "Coin-In" levels of play respectively. Optionally, graphical elements may be used in place of each of the individual Spell-Out Prize Component Square letters to streamline the appearance of the legend and the playfield and reduce potential player confusion. When a player uncovers the final component of the spell-out prize W-I-N, a special feature is activated. (1) W-I-N Feature—Each letter appears to "spin", displaying random credit values between a casino-established maximum and minimum range, based on the "Coin-In" level of play. The player is instructed to choose one of the "spinning W-I-N" squares, which locks in a randomly selected number of credits. This continues until each W-I-N square displays a lockedin number of credits. These credits are then added to the round total credits, which can be affected by credit multiplier squares, and normal game play resumes. In this example game, the minimum and maximum ranges for each "Coin-In" level of play are 10-40 for 2 credits, 30-60 for 3 credits, 50-80 for 4 credits, and 70-100 for 5 credits. In lieu of the W-I-N Feature, a micro-progressive or fixed amount jackpot may be awarded at the casino's discretion, based on the credit value of the associated games. An alternative W-I-N feature will launch a separate bonus screen from which the player may choose from a variety of graphic elements on the screen to reveal their W-I-N bonus. After the player receives their revealed bonus, the remaining graphic elements reveal the unselected bonus amounts, the playfield is restored, and game play continues. When a player uncovers the final component of the spell-out prize G-A-M-E, a special round and playfield is immediately launched. (2) G-A-M-E Feature—The new G-A-M-E playfield consists of a grid of fifteen squares, each containing random credit values based upon the "Coin-In" level of play. Nine of the squares will contain average random credit values, four of the squares will contain above average random credit values, and the remaining two squares will contain large random credit values. The player is instructed to pick one square at a time up to the number of credits played. In other words: 3 selections for 3 credits; 4 selections for 4 credits; and 5 selections for 5 credits. After each selection, the credit value for the selected square is revealed. After all selections have been made, the credits from the selected squares are added to the round total credits, which can be affected by credit multiplier squares, the remaining G-A-M-E squares are briefly revealed to the player, the original game playfield returns, and normal game play resumes. In this example game, the minimum and maximum G-A-M-E playfield square credit value ranges for each "Coin-In" level of play are: 25-50 (average), 50-75 (above avg.), and 100-150 (large) for 3 credits; 50-75 (average), 75-100 (above avg.), and 150-200 (large) for 4 credits; 75-100 (average), 100-125 (above avg.), and 200-250 (large) for 5 credits. When a player uncovers the final component of the spell-out prize B-O-N-U-S, the game is immediately frozen, and a "summon attendant" signal is issued. (3) B-O-N-U-S Feature—Upon arrival, the attendant notifies the player of the magnitude of the B-ON-U-S prize, unfreezes the game, and remains to assist the player with any questions concerning the completion of the game play round. At the end of the round, if the player has not lost or otherwise forfeited the B-O-N-U-S prize by making an "unprotected" or RISK selection of a negative impact square, the player is escorted to a VIP area and prepared to participate in the B-O-N-U-S game. The B-O-N-U-S game consists of a physical display located in close proximity to the game, and decorated in accordance with the game's underlying design them. At a pre-scheduled time, the player is escorted to the display with abundant fanfare and cheering from on-looking casino patrons who have been earlier notified of the event. The player is introduced to the crowd and prompted to select one of twenty game-themed "boxes". The prize, of significant value in accordance with the credit value of the game, and chosen specifically to match the theme of the game, is removed from the selected box and revealed to the player and attending audience. The entire event is captured on video, which will be displayed as part of the "attract mode" of the games, used for casino promotion, and given to the player as a gift and memory of their "big win". Should the player elect to not participate in the B-O-N-U-S game or refuse sign the release forms necessary to record and replay the event, a cash award equal to the fair market value of the smallest prize will be alternately awarded. In lieu of the B-O-N-U-S Feature, a mini-progressive or fixed amount jackpot may be awarded at the casino's discretion, based on the credit value of the associated games. When a player uncovers the final component of the highest level spell-out prize J-A-C-K-P-O-T, both the game and Progressive Jackpot meter are immediately frozen, and a "summon attendant" signal is issued. (4) J-A-C-K-P-O-T Feature—Upon arrival, the attendant notifies the player of the immense magnitude of the J-A-C-K-P-O-T prize, unfreezes the game, and remains to assist the player with any questions concerning the completion of the game play round. At the end of the round, if the player has not lost or otherwise forfeited the J-A-C-K-P-O-T prize by making an "unprotected" or RISK selection of a negative impact square, the player is escorted to a VIP area and awarded the amount of the Progressive Jackpot. The presentation of an over-sized check made out to the player in the amount of the Progressive Jackpot is captured on video, which will be displayed as part of the "attract mode" of the games, used for casino promotion, and given to the player as a gift and memory of their "big win". (5) J-A-C-K-P-O-T with B-O-N-U-S Feature—Available only on the 5th "Coin-In" level of play, this feature requires all seven J-A-C-K-P-O-T and all five B-O-N-U-S letters to be revealed. This is the most difficult award to achieve, and upon winning, the player receives the opportunity to participate in the B-O-N-U-S game, the Progressive Jackpot, and a $5,000,000 Super Prize awarded in either a lump sum or annual installments. The entire event, including the B-O-N-U-S game and the presentation of both over-sized Progressive Jackpot and 5 Million Dollar checks, is captured on video, which will be displayed as part of the "attract mode" of the games, used for casino promotion, and given to the player as a gift and memory of their "big win". In lieu of the J-A-C-K-P-O-T with B-O-N-U-S Feature, a multi-tier progressive jackpot system may be employed with "Mini-Pot", "Midi-Pot", and "Mega-Pot" progressive jackpot meters or fixed amount jackpots (corresponding to 5, 6, and 7 letter Spell-Out Prize with Single Component Squares) to be awarded at the casino's discretion, based on the credit value of the associated games. In such case, the player would receive multiple jackpots for revealing all necessary squares for multiple Spell-Out prizes. (VI) Sequential Cash Award Squares—Contain a single-digit positive numerical value that sequentially fills the Cash Prize in the legend from right to left. These squares begin to appear on the 3 "Coin-In" credit level of play with one square for each "Coin-In" credit played. The values of each square range from 1 to the "Coin-In" credit level played. In other words, for our example game: On the 3 "Coin-In" credit level there are 3 squares containing the numbers 1-3; On the 4 "Coin-In" credit level there are 4 squares containing the numbers 1-4; On the 5 "Coin-In" credit level there are 5 squares containing the numbers 1-5. Each time a sequential cash award square is revealed, the Cash Prize gains an additional digit based on the value of the square revealed. The Cash Prize is awarded at the successful completion of the game play round and selection of the cash-out button either as a redeemable "dispensed ticket" or by attendant payout depending upon the size of the cash prize. Sequential Cash Awards are cash prizes and, unlike credits acquired through credit and credit match-up squares, are not affected by credit multiplier squares. In our example, a 3 "Coin-In" game can generate the following Cash Prizes: $0.10, $0.20, $0.30, $1.20, $1.30, $2.10, $2.30, $3.10, $3.20, $12.30, $13.20, $21.30, $23.10, $31.20 & $32.10. A 4 "Coin-In" game would have maximum Cash Prize of $432.10 and a 5 "Coin-In" game would have a maximum Cash Prize of $5,432.10. The quantity and numeric value of sequential cash award squares can be customized according to credit value. For example, a $0.50 credit value game may utilize only three sequential cash award squares beginning with one square at the 3 "Coin-In" level of play, and adding additional squares on 4-5 "Coin-In" levels for maximum payouts of $0.30, $3.20, and $32.10 respectively. A $5 credit value game would feature the full five sequential cash award squares with no decimal places and values randomly ranging from 1-9 for a maximum potential payout of $99,999. (VII) Instant Win Prize Award Squares—Contain a graphic representation of a prize to be awarded to the player at the end of game play. This is a single win square; meaning that additional squares are not required to be selected in order for the contents of the instant win prize square to be awarded to the player. Instant Win Prizes are typically property specific awards, such as casino-branded merchandise, dining and spa gift certificates, show tickets, rounds of golf, and transportation and room vouchers. Basically, anything the casino typically uses as a "comp" can be integrated as an Instant Win Prize, thereby allowing both the casual and dedicated player the opportunity of winning rewards that are typically reserved for table game players. Availability and frequency of Instant Win Prizes are assigned based upon "Coin-In" credit level of play and credit value of the game. The legend will reflect the number of included Instant Win Prizes; however, the player will not know which prizes have been assigned to the game round. Higher "cost" Instant Win Prizes may populate less frequently than prizes whose "value" greatly exceeds their internal "cost" to the casino. For example, a $0.50 credit value game may offer T-shirts, leather jackets, poker chip sets, buffet vouchers and room upgrades as Instant Win Prizes with the lower "cost" T-shirts and buffet vouchers appearing most frequently. A $5 credit value game may offer premium seating at popular on-property shows, complete meals at signature dining venues, full-day spa experiences, value-specified shopping sprees at on-property merchants, and return trip airfare and accommodations for a future on-property stay, with the lower "cost" full-day spa experience, signature dining, and return trip with accommodations appearing most frequently. Instant Win Prizes are not subject to credit multiplier squares; however, they can be adversely affected by negative impact squares. For casinos not wishing to offer physical prizes, comp points may be awarded either by posting directly to an inserted Player's Card or printed on a redeemable "dispensed ticket". This feature may also be disabled with no Instant Win squares appearing in the game. (VII) Remove "Empties" Squares—Contain a single-digit positive numerical value of empty squares to be revealed and removed from the current round of game play. This is an action square, meaning that it holds no intrinsic value to be won or lost, and upon selection, empty squares are randomly removed immediately, and the player is instructed to select again, as revealing a Remove "Empties" square does not cost the player a selection. The removal of empty squares increases the odds that the player will select a positive impact square while making their "protected" or SAFE selections. Squares that are marked to contain negative impact results when the selections become "unprotected" or RISK selections will not be affected. Removing a quantity of empty squares aids the player during their "protected" or SAFE selection stage, yet also increases the general odds of the player selecting a negative impact square during the "unprotected" or RISK selection stage. In our example game, a Remove-5 "Empties" square will be added at each "Coin-In" level of play from 1-4 for a maximum possible total of 5, 10, 15, and 20 empty squares to be removed on each level respectively. To increase the speed of game play, this feature may be disabled. (IX) "Make Safe" Selection Squares—Contain a single-digit positive numerical value of "unprotected" or RISK selections to convert to "protected" or SAFE selections during the current round of game play. This is an action square, meaning that it holds no intrinsic value to be won or lost, and upon selection, the specified number of "unprotected" or RISK selections is immediately converted to "protected" or SAFE selections, the player is notified of the change (i.e. "You now have 8 protected or SAFE and 4 unprotected or RISK selections") and instructed to select again as revealing a "Make Safe" Selection square does not cost the player a selection. It simply converts a specified number of remaining "unprotected" or RISK selections into "protected" or SAFE selections. These squares begin to appear on the 3 "Coin-In" credit level of play, and the number and value of available "Make Safe" Selection squares should not meet or exceed the quantity of "unprotected" or RISK selections on each level. For example: The 3 "Coin-In" credit level contains 2 Safe-I Selection Squares; The 4 "Coin-In" credit level contains 3 Safe-1 Selection Squares; The 5 "Coin-In" credit level contains 2 Safe-1 and 1 Safe-2 Selection Squares. In this configuration, even if all "Make Safe" Selection squares are revealed, the player will still have the opportunity to make at least one "unprotected" or RISK selection during game play. If a player reveals a "Make Safe" Selection square on an "unprotected" or RISK selection, they are prompted to select again, only this time as a "protected" or SAFE selection. After the "Make Safe" Selection has been made, the player returns to their remaining "unprotected" or RISK selections. If a player reveals a Safe-2 "Make Safe" Selection square on their last selection, they will be prompted to select again as a "protected" or SAFE selection. However, since there are no remaining "unprotected" or RISK selections to convert to "protected" or SAFE status, the second "Make Safe" Selection remains unused, and the round ends. To increase the speed of game play, this feature may be disabled.

Negative impact squares are assigned to the game playfield though the software platform based upon manufacturer and casino specified odds for each "Coin-In" credit level and value of game play. Types or categories of negative impact squares contain drawbacks and/or forfeitures which adversely affect the outcome of game play for the player and are active only when the player makes an "unprotected" or RISK selection. The software platform will employ negative impact squares including: (I) End Round Squares, (II) Lose Spell-Out Squares, (III) Lose Credit Multiplier Squares, (IV) Lose Sequential Cash Award Squares, (V) Lose Instant Win Prize Award Squares, (VI) Lose ½ Acquired Credits Squares, (VII) Lose ALL Acquired Credits Squares, (VIII) Variations of Negative Impact Squares. (I) End Round Squares—Contain a themed graphic indicating the round has come to an end. This is an action square, meaning that its effect is immediate. Of all the negative impact squares, this is the least damaging, merely forcing the player to lose any remaining "unprotected" or RISK selections. The round terminates with any winnings being delivered to the player. (II) Lose Spell-Out Squares—Contain a themed graphic indicating that the player must forfeit all Spell-Out squares accumulated. This is an action square, meaning that its effect is immediate. If a player has a completed Spell-Out square prize, it is also immediately forfeited. The player may continue to acquire remaining Spell-Out squares after uncovering this square; however, any previously selected Spell-Out squares that are lost as a result cannot be recovered in this round. (III) Lose Credit Multiplier Squares—Contain a themed graphic indicating that the player must forfeit all Credit Multiplier squares accumulated. This is an action square, meaning that its effect is immediate. The player may continue to acquire remaining Credit Multiplier squares after uncovering this square; however, any previously selected Credit Multiplier squares that are lost as a result cannot be recovered in this round. (IV) Lose Sequential Cash Award Squares—Contain a themed graphic indicating that the player must forfeit all Sequential Cash Award squares accumulated. This is an action square, meaning that its effect is immediate. The player may continue to acquire remaining Sequential Cash Award squares after uncovering this square; however, any previously selected Sequential Cash Award squares that are lost as a result cannot be recovered in this round. (V) Lose Instant Win Prize Award Squares—Contain a themed graphic indicating that the player must forfeit all Instant Win Prize Award squares accumulated. This is an action square, meaning that its effect is immediate. The player may continue to acquire remaining Instant Win Prize Award squares after uncovering this square; however, any previously selected Instant Win Prize Award squares that are lost as a result cannot be recovered in this round. (VI) Lose ½ Acquired Credits Squares—Contain a themed graphic indicating that the player must forfeit ½ of their accumulated credits. This includes credits received through Credit and Credit Match-Up squares, as well as the W-I-N and G-A-M-E features. This is an action square, meaning that its effect is immediate. The player may continue to acquire credits after uncovering this square. Credit Match-Up squares continue to function normally, even if ½ of the credits awarded for an existing match are lost. (VII) Lose ALL Acquired Credits Squares—Contain a themed graphic indicating that the player must forfeit ALL of their accumulated credits. This includes credits received through Credit and Credit Match-Up squares, as well as the W-I-N and G-A-M-E features. This is an action square, meaning that its effect is immediate. The player may continue to acquire credits after uncovering this square. Credit Match-Up squares continue to function normally, even if ALL of the credits awarded for an existing match are lost. (VIII) Variations of Negative Impact Squares—Contain combinations of two or more types of negative impact squares at the discretion of the casino (i.e. Lose it ALL). Negative impact squares are initially deployed by the RNG at the beginning of the round; however, they remain inactive until the player reaches their first "unprotected" or RISK selection. At the casino's discretion, negative impact squares may be completely or partially deployed throughout the "unprotected" or RISK selections according to each "Coin-In" credit level of play. In our example game, negative impact squares are deployed as follows: The 1 "Coin-In" credit level 100% on 1st and only "unprotected" or RISK selection; The 2 "Coin-In" credit level 50% each on 1st-2nd "unprotected" or RISK selections; The 3 "Coin-In" credit level 33% each on 1st-3rd "unprotected" or RISK selections; The 4 "Coin-In" credit level 25% each on 1st-4th "unprotected" or RISK selections; and The 5 "Coin-In" credit level 20% each on 1st-5th "unprotected" or RISK selections. At the casino's discretion, the game can inform the player of the number of active negative impact squares and/or risk percentage of selecting a negative impact square prior to each "unprotected" or RISK selection. If a player selects a negative impact square during a "protected" or SAFE selection or an inactive negative impact square during an "unprotected" or RISK selection, the "penalty" is revealed to the player and the square is "destroyed" rendering it harmless. While neither helping nor harming the player, the player's overall odds of winning are slightly affected. It should also be noted that a player is not required to make any "unprotected" or RISK selections. Electing to risk losing the value associated with prior "protected" or SAFE selections is completely voluntary. The player may choose to end the game after making all of their "protected" selections or prior to making any "unprotected" or RISK selection. To increase the speed of game play and reduce potential player confusion, a single type of negative impact square may be employed and populated throughout the playfield at the beginning of game play. All instances of this negative impact square become immediately active after the player finishes making their "protected" or SAFE selections. Revealing any negative impact square during an "unprotected" or RISK selection results in the player losing all accumulated winnings and immediately ends the round of game play.

Indifferent squares are assigned to the game playfield though the software platform based upon manufacturer and casino specified odds for each "Coin-In" credit level and value of game play. Types or categories of indifferent squares neither help nor harm the player. The primary purpose of these squares is to adjust the player's overall odds of winning. The software platform will employ indifferent squares including: (I) Empty Squares and (II) Inactive Negative Impact Squares. (I) Empty Squares—Contain a themed graphic indicating an empty square. There is no value or action associated with this square. Upon being revealed as empty, the square is "destroyed". (II) Inactive Negative Impact Squares—Contain a themed graphic indicating the specific drawback and/or forfeiture assigned. Upon being revealed, the player is notified that the square is inactive, either due to their selection being "protected" or SAFE or an "unprotected" or RISK selection of a negative impact square that has yet to be activated, and the square is "destroyed" rendering it harmless. The calculated deployment of positive impact, negative impact and indifferent squares allows the casino to custom-tailor the odds of winning specific prizes, as well as the general odds of winning on each "Coin-In" credit level of play. Even so, the player will be made well aware of the fact that their gaming experience is not an RNG predetermined win or loss, but an intricate interplay of their own luck coupled with their decision to risk current winnings to potentially unlock even greater rewards.

The playfield approach may also be adapted to video poker as well, with the entire deck of 52 electronic cards making up the playfield, and the player selecting their initial five card hand and discard replacements from all available choices on-screen. At the end of game play, the playfield is revealed. Unlike traditional video poker, where the player will only be exposed to a maximum of the first ten cards of the "shuffled" deck, our playfield approach puts every possible choice in front of the player throughout the entire game. At the end of game play, the player sees where everything is on the playfield and, unlike traditional video poker, isn't left wondering "What would have happened if I had played my hand differently?" Additionally, bonuses such as credit multipliers, bonus games, etc. may be hidden within the playfield, appearing either as extra "cards" on the playfield or as "attachments" to specific cards on the playfield. The bonuses and attachments may also be associated with the frames in which the cards are provided, within the frames, adjacent the frames, under the frames and the like. This adds yet another exciting dimension to traditional video poker by allowing the player to "discover" these bonuses by physically making their card selections from the playfield. In a Video Poker type format, for the purpose of this example, bonuses will be "attachments" to specific cards on the playfield. By utilizing this approach, bonuses may be lost or forfeited if the player discards a card to which the bonus is "attached". Bonuses "attached" to cards may include but are not limited to: (I) Credit Multipliers, (II) Bonus Games, and (III) Instant Win Prizes. The game of video poker itself becomes revitalized, as players will no longer be able to rely on their strategy cards to make the right move for the highest possible return on their game play. Cards in their hands that they would normally discard in favor of building a stronger hand may suddenly be seen as intrinsically more valuable if a particular bonus happens to be "attached" to them.

(I) Credit Multipliers—Contain a positive numerical value that acts as a multiplier to be applied to game play credits accumulated during the round at the end of game play. This is a dependent win bonus, meaning that the player must acquire a winning poker hand as defined in the pay table in order for the associated winning hand value (also defined in the pay table) to be multiplied by the value of the credit multiplier(s). In essence, credit multiplier bonuses without a winning hand value to multiply have no individual intrinsic value. Values of credit multiplier bonuses along with the number of available multiplier bonuses are specified by the casino. In this example game, credit multiplier values include Credit Multiplier [×2]-[×3] with two Credit Multiplier [×2] and two Credit Multiplier [×3] bonuses available. If a player selects one or more cards with credit multiplier bonuses attached, the credit multiplier value is increased accordingly and applied to the total number of credits won for a winning poker hand as defined in the pay table at the end of the game. For example, if a player uncovers two cards with Credit Multiplier [×2] and Credit Multiplier [×3] attached, and at the end of the round the player has a winning poker hand containing the two "bonus attached" cards that awards 20 credits, those 20 credits will be multiplied by the Bonus Multiplier value, which in this case is 5 (the multiplier values are added to arrive at the Bonus Multiplier value—thus 2+3=5) for a total of 100 credits won. The variety, value, and number of available credit multiplier bonuses is established by the casino for each "Coin-In" credit level of play. Typical deployment scenarios would set the maximum Bonus Multiplier value at 10 with up to five Credit Multiplier "bonus attachments" in play at a given time. However, these values may be altered at the casino's discretion. It is suggested that credit multipliers be reserved for the highest "Coin-In" credit levels of play, with the option of charging additional credits beyond the video poker standard maximum of 5 "Coin-In" credits for the addition of Credit Multiplier bonuses to the game. In our example, one Credit Multiplier [×2] bonus and one Credit Multiplier [×3] bonus become available at the 6 "Coin-In" credit level of play for a maximum Credit Multiplier value of 5. The remaining Credit Multiplier [×2] and Credit Multiplier [×3] bonuses become available at the 7 "Coin-In" credit level of play for a maximum Credit Multiplier value of 10.

(II) Bonus Games—Contain a graphic representation indicating a specific Bonus Game to be awarded to the player at the end of game play should the player obtain a winning poker hand as defined in the pay table. In order for the Bonus Game to be awarded, the card to which the Bonus Game is "attached" must remain in the player's hand at the end of the game play. The number and type of bonus games available may be selected by the casino with property-specific customization options available. Further, at the casino's discretion, the Bonus Game may employ either a static or variable award valuation mechanism. In other words, if a static approach is used, regardless of the rank or the player's winning hand, the minimum and maximum award values of the Bonus Game remain constant—the same values are used if the player wins with a pair of Jacks or four-of-a-kind. If a variable valuation mechanism is selected, the rank of the player's winning hand is factored into determining the minimum and maximum award values of the Bonus Game. A player awarded a Bonus Game based upon a Royal Flush winning hand will have a significantly higher value Bonus Game than a player with a winning hand of two-pair. In this example, the Bonus Game consists of a playfield containing 20 face-down cards corresponding to the 10, Jack, Queen, King, and Ace of each Suit. The player is instructed to select five cards from the playfield to generate their Bonus Game hand. Nearly every possible hand, given the cards in play, will result in a Bonus Game award based upon the rank of the hand the player creates in the Bonus Game. Again, the awards may be further affected by the rank of the player's winning hand that launched the Bonus Game if the variable valuation mechanism is employed to determine the minimum and maximum levels of the Bonus Game award. In other words, credits would be awarded for a pair of Jacks or better, two-pair, 3-of-a-kind, straight, full house, 4-of-a-kind, and a Royal Flush based upon rank. The only hand not resulting in a Bonus Game award would be a pair of 10's, in which case either no credits or a consolation bonus may be awarded at the casino's discretion. Ranked Bonus Game winning hands may also be further sub-divided by card values or suit, resulting in even more potential award combinations (i.e. pairs of Kings or Aces ranking higher than Jacks or Queens and a Spade-suited Royal Flush ranking higher than Hearts, Clubs, or Diamonds). At the end of the Bonus Game, the credits awarded are added directly to the player's bank. Since the Bonus Game is played as a separate round after the player has won their video poker hand with the Bonus Game "attachment", credits awarded as a result of Bonus Game play are not subject to the Credit Multiplier. It is suggested that the Bonus Game be reserved for the highest "Coin-In" credit levels of play, with the option of charging additional credits beyond the video poker standard maximum of 5 "Coin-In" credits for the addition of Bonus Game functionality. In our example, the Bonus Game becomes available at the 7 "Coin-In" credit level of play.

(III) Instant Win Prizes—Contain a graphic representation of a prize or "mystery prize" to be awarded to the player at the end of game play should the player obtain a winning poker hand as defined in the pay table. In order for an Instant Win Prize to be awarded, the card to which the Instant Win Prize is "attached" must remain in the player's hand at the end of the game play. At the Casino's discretion, the variable valuation mechanism may be employed, resulting in the value of the Instant Win Prize award increasing with the rank of the player's winning poker hand. For example, a winning hand of four-of-a-kind would result in a significantly higher value Instant Win Prize than for a pair of Jacks. Otherwise, a static approach may be used in which the rank of the winning hand plays no role in the selection of the Instant Win Prize awarded. Instant Win Prizes are typically property specific awards, such as casino-branded merchandise, dining and spa gift certificates, show tickets, rounds of golf, transportation and room vouchers. Basically, anything the casino typically uses as a "comp" can be integrated as an Instant Win Prize (even "comp points" awarded directly to the player's card or by a printed redeemable ticket), thereby allowing the casual as well as dedicated player the opportunity of winning awards typically reserved for table game players. Availability and frequency of Instant Win Prizes are assigned based upon "Coin-In" credit level of play and credit value of the game. Higher "cost" Instant Win Prizes may populate far less frequently than prizes whose "value" greatly exceeds their internal "cost" to the casino. For example, a $0.50 credit value game may offer casino-branded T-shirts and jackets, poker chip sets, buffet vouchers and room upgrades as Instant Win Prizes with the lower "cost" T-shirts and buffet vouchers appearing most frequently. A $5 credit value game may offer premium seating at popular on-property shows, vouchers for meals at featured dining venues, signature spa treatments, value-specified shopping sprees at on-property merchants, and return trip airfare and accommodations for future on-property stays, with the lower "cost" signature spa treatments, featured dining and return trip vouchers appearing most frequently. It is suggested that Instant Win Prizes be reserved for the highest "Coin-In" credit levels of play, with the option of charging additional credits beyond the video poker standard maximum of 5 "Coin-In" credits for the addition of Instant Win Prizes. In our example, Instant Win Prizes become available at the 7 "Coin-In" credit level of play. As an optional feature to be implemented at the casino's discretion, the Instant Win Prize to be awarded may be selected by the player via a bonus-round style display where the player makes their choice from a variety of on-screen graphics, each corresponding to a hidden Instant Win Prize. Instant Win Prizes are not subject to credit multipliers.

This unique concept of randomly "attaching" various bonuses to the cards may be applied to the current installed base of video poker machines, or virtually any version of a card-based game for that matter. This enhancement allows players to choose between traditional video poker play, or for an extra credit or two, a revitalized video poker experience in which the player has new choices and decisions to make to heighten their overall enjoyment of a new, novel approach to game play. This approach allows us to capitalize on a tremendous installed base of existing video poker machines. Rather than replacing them with new games with new rules to master, we can instead offer players a new way of playing their favorites by incorporating the playfield approach to video poker, the bonus "attachments" to randomly selected cards, or both of these novel concepts. The result is an enhanced player experience featuring new and exciting ways of winning on classic, proven games, coupled with significantly improved casino revenues generated from the slight increase in cost of play to take advantage of these new bonus methods.

Additional customization options to further enhance game play may include but are not limited to: (I) Pay to Continue Playing Your Game, (II) Single Press or Double-Touch Selection Instead of Confirm Button and (III) Random Pick Button.

(I) Pay to Continue Playing Your Game—This option becomes available at the end of game play and may be configured to appear on winning games, losing games or not at all. At the end of game play, prior to the reveal of the playfield, the player is offered the option of reselecting their "draw" cards to replace their discards by paying a casino-specified amount of credits up to their maximum bet. The selected and discarded cards remain visible on the playfield while the remaining unselected cards are reshuffled and dispersed across the playfield. The player is then granted the opportunity to select their "draw" cards again from the playfield. Based upon odds calculations, the Pay to Continue Playing Your Game option may be offered once or multiple, successive times on the same round of game play, or not at all. This approach may also be used to integrate the playfield approach into triple, five, and ten play versions of video poker.

(II) Single Press or Double-Touch Selection Instead of Confirm Button—In the interest of increasing the overall speed of game play, the Confirm Button functionality may be deactivated, resulting in the immediate selection of the card with a single press of the screen by the player. While resulting in a faster game, accidental or inaccurate screen presses may result in player annoyance. A Double-Touch Selection process may then be employed with the first screen press highlighting the selected card following by a subsequent press of the same card for confirmation. While actually resulting in more screen presses than using the Confirm Button, less overall hand movement is required, which may result in reduced player fatigue and longer play sessions. Given that most computer-savvy players are familiar with the "double-click" of a mouse, the Double-Touch Selection method is an easy concept to master and affords an extra level of safety against accidental player screen touches. The Double-Touch Selection method may also be used in conjunction with an active Confirm Button, thereby allowing players to use either method to make their selections.

(III) Random Pick Button—In the interest of increasing the overall speed of game play and adding a novel approach to the selection process, a Random Pick button may be employed to randomly make one or more selections from the displayed deck. The number of random selections made is determined by the number of cards the player has already selected during the Deal as well as during the Draw. Naturally, the player may manually or randomly select only the same number of discards during the Draw. For example, if the player is in the process of making their Deal selections and has already selected three cards from the displayed deck, pressing the Random Pick button will result in two random cards being selected. Pressing the Random Pick button when no cards have been selected during the Deal will result in all five cards being selected randomly. Since Draw selections are made based upon the number of discards, pressing the Random Pick button during the Draw selection results in the same number of cards discarded being selected. The player still has the option of selecting one or more Draw cards manually up to the total number of cards discarded and/or using the Random Pick button to complete their selection or not at all. The Random Pick button may be pressed repeatedly, resulting in the random reselection of the same number of cards that were randomly selected. This allows the player the option of selecting desired cards, if any, and pressing the Random Pick button any number of times until such time as they are aesthetically pleased with the "pattern" of selected cards in the playfield deck. The feature opens the door to enhanced playability for players who have a "gut feel" on how they want their card selections distributed across the playfield as well as those players who follow certain beliefs or superstitions based upon numbers or touching the machine in a specific manner or number of times. In this configuration, the Confirm button must still be pressed to accept and validate the card selections made. As an option, the Random Pick button may be configured to randomly choose and confirm the card selections in a single button press, thereby allowing for only a single press of the Random Pick button. The Random Pick button may be enabled or disabled at the casino's discretion.

The status and information area legend is updated through the software platform and reports important game play information to players, thereby allowing them to make more informed decisions throughout the course of their gaming experience. The status and information area legend corresponds to a portion of the screen reserved to notify the player of various game statistics as well as prompt the player for action. In certain situations, games may be deployed with a secondary screen to display this information with the primary screen reserved for the game playfield, animation and multimedia sequences. The software platform will initially populate the status and information area legend with data based upon the players selected "Coin-In" credit level of play and perform updates after each selection is made by the player. Displayed information may include but is not limited to: (I) Selections Remaining, (II) Positive Impact Squares, (III) Negative Impact Squares, (IV) Indifferent Squares, (V) Bet, Total So Far, Paid, and "Bank" Credits, (VI) Multiplier Status, (VII) Prize Status, and (VIII) Selection Odds. (I) Selections Remaining—Displays the number of "protected" or SAFE and "unprotected" or RISK selections the player has remaining. (II) Positive Impact Squares—Displays the total and individual number of each corresponding type of positive impact square available on the playfield, as well as those selected by the player. (III) Negative Impact Squares—Displays the total number of active negative impact squares on the playfield, as well as those selected by the player. (IV) Indifferent Squares—Displays the total number of empty and inactive negative impact squares on the playfield, as well as those selected by the player. (V) Bet, Total So Far, Paid, and "Bank" Credits—Displays the total number of credits the player has bet, has accumulated during the round, has won and been paid at the end of the round, and has remaining in their "credit bank" to continue playing or cash out, (VI) Multiplier Status—Displays the value of the credit multiplier for the current round based upon player selections, (VII) Prize Status—Displays any prizes the player may have accumulated during the current round, and (VIII) Selection Odds—Displays the odds of the player's next selection resulting in a positive, negative, or indifferent result. To increase the speed of game play and reduce potential player confusion, (II) Positive Impact Squares, (III) Negative Impact Squares, (IV) Indifferent Squares, (VII) Prize Status, and (VIII) Selection Odds may be displayed only when the player selects an Info/Stats button to view this information, or not displayed at all at the casino's discretion.

Game themes consist of graphics, sound effects, animations, multi-media presentations and physical displays which may be applied to the software platform and areas surrounding the game to attract players, maintain their interest, and provide a unique, fun-filled gaming experience. Game themes are the exterior packaging or "skin" that encloses the software platform and surrounding hardware displays. They compliment the mechanics behind the software with storyline, background, sights and sounds, and various other elements that enrich the gaming experience and appeal to and attract players. The software platform may be "wrapped" in a variety of themes including but not limited to the following unique and somewhat whimsical themes: (I) Liquid Gold, (II) Buried Treasure Hunt, (III) Inside Job, and (IV) Safe Cracker. (I) Liquid Gold—This game is themed around a beehive, with the playfield "squares" in the form of hexagons making up a honeycomb. When the player makes and confirms a selection the following animated results are displayed: Positive impact squares "ooze" with golden honey or royal jelly, depending upon value, which then "morphs" into a representation of the square's contents. Negative impact squares reveal an angry bee, which proceeds to "attack" the player by revealing the drawback or forfeiture if the square is active. If the square is inactive, the angry bee is swatted, squashed, sprayed with bug-spray, or otherwise dispatched. Empty squares reveal dust, cobwebs, a "room-for-rent" sign, or other amusing representations of the square having no significant contents. Prizes are themed around gold and golden items which may include gold coins, gold jewelry, "Gold Coast" vacations, and possibly even a gold-painted Hummer. The B-O-N-U-S game physical display will resemble a honeycomb with 20 large hexagonal "cells" from which the player may select. Each cell randomly contains gold bars weighing between a casino-specified minimum and maximum amount. The game also features a display showing the current gold market price per ounce. (II) Buried Treasure Hunt—This game is themed around finding pirate's buried treasure where "X" marks the spot for hidden pirate booty. The playfield consists of a sandy beach with dunes and palm trees, and a variety of "X" marks in the sand. The "X" marks may be drawn, formed by shells, sticks, sand-dollars, coconuts, skulls, crossed trees, bones, swords, etc. with each "X" corresponding to a playfield square. When the player makes and confirms a selection, the following animated results are displayed: Positive impact squares dig up a chest that opens to reveal gold coins, jewels, etc., depending upon value, which then "morph" into a representation of the square's contents. Negative impact squares reveal a cleverly placed pirate's trap which is sprung on the player by revealing the drawback or forfeiture if the square is active. If the square is inactive, the trap is sprung but fails to snare or otherwise damage the player. Example traps can include blow darts, falling boulders, trap-doors, spring launching platforms, octopus tentacles, hidden spikes, and even a pirate's ghost. Empty squares dig up old boots, a laughing skull, a "Wilson® volleyball" with a face on it, fish bones, an "ocean-view for sale" sign, or other amusing representations of the square having no significant contents. Prizes are themed around pirate's buried treasure which may include doubloons, gems, actual recovered shipwreck booty, Caribbean or tropical island vacations, and possibly even a boat or pair of jet-skis flying the "jolly roger". The B-O-N-U-S game physical display will resemble a small tropical island with 20 large treasure chests from which the player may select. Each chest randomly contains a treasure (i.e., gold coins, gold-link chains, silver bars, gems, jewelry, etc.) valued between a casino-specified minimum and maximum amount. In addition to the prize, each chest is filled with sand, so the player must actually dig with their hands to "unearth" the treasure beneath that awaits them. (III) Inside Job—This game is themed around having free access to open safety deposit boxes in a bank vault. Many movies have presented this scenario to the delight of audiences. The playfield consists of a wall of safety deposit boxes of varying sizes, with each box corresponding to a playfield "square". When the player makes and confirms a selection, the following animated results are displayed: Positive impact squares swing open to reveal cash, valuables, stocks and bonds, etc., depending upon value, which then "morph" into a representation of the square's contents. Negative impact squares reveal a watch dog, security guard, an alarm, or police lights and sirens, which proceed to "harass" the player by revealing the drawback or forfeiture if the square is active. If the square is inactive, the watch dog is offered a bone or steak, the security guard falls back asleep or decides to watch TV, the alarm wires are cut or the alarm is otherwise silenced, and the police are sent on a different "call" or ordered to take a meal break at the local donut shop. Empty squares open to reveal dust, cobwebs, a "deed" to the Brooklyn bridge, "Enron" stock certificates, a stack of IOU's, a Florida swamp land contract, or other amusing representations of the square having no significant contents. Prizes are themed around valuables typically stored for safe keeping such as cash, "family" jewels, U.S. savings bonds, rare collectibles (i.e., expensive baseball cards), and possibly even the "pink slip" to a vintage vehicle. The B-O-N-U-S game physical display will resemble the interior of a bank vault with 20 large safety deposit boxes from which the player may select. Each box randomly contains valuables (i.e. cash, rare coins or collectibles, jewelry, U.S. savings bonds, a deed to a new Las Vegas condominium, etc.) valued between a casino-specified minimum and maximum amount. Should a "family" of casinos insist upon exclusivity of a theme across their properties, a variation of the Inside Job theme titled Safe Cracker may be employed. (IV) Safe Cracker—This variation of Inside Job is themed around opening safes of various shapes and sizes. The playfield consists of a group of safes of various styles (i.e. key, dial tumbler, numerical, digital keypad, etc.), with each safe corresponding to a playfield "square". Given the similarities between safety deposit boxes and safes, the animated sequences for positive impact, negative impact and empty squares, as well as the type of prizes available, will be quite similar to those described in the Inside Job theme with minor variations. The B-O-N-U-S game physical display will resemble the interior of a well decorated study that could be found in a typical mansion. Throughout the study are 20 safes of different shapes and sizes, including several large freestanding safes, wall safes, and perhaps even a child's toy safe from which the player may select. Each safe randomly contains valuables akin to those described in the Inside Man theme valued between a casino-specified minimum and maximum amount.

Additional customization options to further enhance game play include: (I) Pay to Continue Playing Your Game, (II) User-Selectable Number of Safe vs. Risk Choices, (III) Single Press or Double-Touch Selection Instead of Confirm Button and (IV) Random Pick Button. (I) Pay to Continue Playing Your Game—This option becomes available at the end of game play and may be configured to appear on losing games, winning games, or not at all. At the end of game play, prior to the reveal of the playfield, the player is offered the option of continuing to play their game by paying a casino-specified amount of credits up to their maximum bet. The player is then granted a casino-specified number of additional "protected" or SAFE selections and/or "unprotected" or RISK selections which they may use to continue playing their game, taking advantage of all "positive-impact" squares that they have already revealed. Based upon odds calculations, the Pay to Continue Playing Your Game option may be offered once or multiple, successive times on the same round of game play or not at all. (II) User-Selectable Number of Safe vs. Risk Choices—This option offers the player additional control over their game play experience by allowing them to select the Number of Safe vs. Risk Choices via a slider control on the screen. The slider would be adjustable from left or SAFER to right or RISKIER. At the far left position, the player would receive the maximum number of "protected" or SAFE selections and minimum number of "unprotected" or RISK selections based upon their coin-in level of play. In this example, as the slider is moved one position from left to right, the player "exchanges" one of their "protected" or SAFE selections for two "unprotected" or RISK selections. The slider can continue to be moved from left to right until such time as the player has "exchanged" all of their "protected" or SAFE selections for twice as many "unprotected" or RISK selections. Based upon our example, at the 5 coin-in level of game play, the leftmost or safest position affords the player with 7 "protected" or SAFE selections and 5 "unprotected" or RISK selections, while the rightmost or riskiest position offers NO "protected" or SAFE selections and 19 "unprotected" or RISK selections. Players favored by an abundance of good luck may opt for the riskier game in which they have more chances to reveal positive impact squares. The ratio of "unprotected" or RISK selections offered for each "protected" or SAFE selection "exchanged" is an operator adjustable setting selected by the casino. (III) Single Press or Double-Touch Selection Instead of Confirm Button—In the interest of increasing the overall speed of game play, the Confirm Button functionality may be deactivated, resulting in the immediate selection of the cell with a single press of the screen by the player. While resulting in a faster game, accidental or inaccurate screen presses may result in player annoyance. A double-touch selection process may then be employed with the first screen press highlighting the selected square following by a subsequent press of the same square for confirmation. While actually resulting in more screen presses than using the Confirm Button, less overall hand movement is required, which may result in reduced player fatigue and longer play sessions. Given that most computer-savvy players are familiar with the "double-click" of a mouse, the Double-Touch Selection method is an easy concept to master and affords an extra level of safety against accidental player screen touches. The Double-Touch Selection method may also be used in conjunction with an active Confirm Button, thereby allowing players to use either method to make their selections. (IV) Random Pick Button—In the interest of increasing the overall speed of game play and adding a novel approach to the selection process, a Random Pick button may be employed to randomly make one or more selections from the playfield. The number of random selections made is determined by whether the player is making SAFE or RISK selections and the number of selections the player has already made. For example, if the player is in the process of making seven SAFE selections and has already made three SAFE selections from the playfield, pressing the Random Pick button will result in four random, additional SAFE selections being made. Pressing the Random Pick button when no SAFE selections have been made will result in all SAFE selections being made randomly. Since RISK selections are made individually, pressing the Random Pick button during a RISK selection results in a single, random selection being made. The Random Pick button may be pressed repeatedly, resulting in the random reselection of the same number of selections that were randomly made. This allows the player the option of making desired selections, if any, and pressing the Random Pick button any number of times until such time as they are aesthetically pleased with the "pattern" of their selections in the playfield. The feature opens the door to enhanced playability for players who have a "gut feel" on how they want their selections distributed across the playfield as well as those players who follow certain beliefs or superstitions based upon numbers or touching the machine in a specific manner or number of times. In this configuration, the Confirm button must still be pressed to accept and validate the selections made. As an option, the Random Pick button may be configured to randomly choose and confirm the selections in a single button press, thereby allowing for only a single press of the Random Pick button. The Random Pick button may be enabled or disabled at the casino's discretion.

The software platform calls upon the functions associated with positive impact, negative impact, and indifferent squares each time the player makes and confirms a selection from the playfield. At the beginning of the game as well as after each player selection, the status and information area legend is updated to reflect the remaining contents of the game playfield, current player winnings, selections remaining, associated odds, and other useful information that aides the player in their risk versus reward decisions. The software platform and associated physical displays near the games are "wrapped" in the casino's choice of themes available from the manufacturer and customized to meet the casino's specific desires.

Example Game Basic Play Logic: (1.) The player inserts coins, cash, or a ticket into the game. (2.) The player is prompted to select the "Coin-In" credit 1-5 level of play. The screen displays additional benefits of each successive level, including the quantity of each type or category of positive impact square along with the number of "protected" or SAFE selections for each "Coin-In" credit level of play. (3.) The player selects and confirms the "Coin-In" credit level of play. The RNG is called to populate the positive impact, negative impact, and indifferent squares throughout the playfield. (4.) The player is prompted to choose and confirm their 1 st "protected" or SAFE selection. Upon selection through the touch screen and confirmation with a physical button press to avoid accidents, the selected square is revealed. The type of square is processed, and "winning functions" are checked for completion (i.e. W-I-N, G-A-M-E, B-O-N-U-S, J-A-C-K-P-OT, etc.). If a "winning function" occurs, the appropriate follow-up action is taken (i.e., launch W-I-N or G-A-M-E features or freeze game for attendant assistance). Once complete, credits, multipliers, sequential cash awards, etc. are updated in the legend. (5.) The player is prompted to choose and confirm their next "protected" or SAFE selection. The processes outlined in steps 4-5 continue until there are no "protected" or SAFE selections left. At the casino's discretion, as an alternative for speedier game play, all "protected" or SAFE selections may be made at once followed by a single, physical confirmation button press. All selected squares are then revealed at once and "winning functions" are checked for completion with appropriate follow-up action. (6.) The player is asked if they would like to end the game or elect to make an "unprotected" or RISK selection. If the player chooses to end the game, the entire playfield is revealed, credits amassed during the round are added to the players "credit bank" and prizes won are delivered as a redeemable "dispensed ticket" or via attendant assistance. If the player chooses to continue, the casino-specified percentage of negative impact squares for the "Coin-In" level of play are randomly activated. (7.) The player is prompted to choose and confirm their 1st "unprotected" or RISK selection. The player still possesses the option to end the game until such time as they confirm their selection. Upon confirmation with a physical button press to avoid accidents, the selected square is revealed. The type of square is processed, now including active drawbacks and/or forfeitures, and "winning functions" are checked for completion with appropriate follow-up action. If a "Make Safe" selection square is revealed, the player is informed of the conversion of their "unprotected" or RISK selection to a "protected" or SAFE selection and prompted to select another square under the security of "protected" or SAFE status. (8.) The player is prompted once again if they would like to end the game or elect to make another "unprotected" or RISK selection. The processes outlined in steps 6-8 continue until there are no "unprotected" or RISK selections left, the player elects to end the game with "unprotected" or RISK selections remaining unused, or an active negative impact End Round (or game terminating) square is selected. (9.) At the end of the round, the entire playfield is revealed, and the player is updated on their round winnings with credits delivered to the player's "credit bank", prizes valued below a casino-established threshold delivered as a redeemable "dispensed ticket", and larger winnings and B-O-N-U-S game participation and progressive J-A-C-K-P-O-T winnings handled by an attendant and/or casino management. (10.) The player is prompted once again to select their desired "Coin-In" credit 1-5 level of play or cash out the remaining credits in their "credit bank". The calculated deployment of positive impact, negative impact and indifferent squares allows the casino to custom-tailor the odds of winning specific prizes, as well as the general odds of winning on each "Coin-In" credit level of play. Even so, the player will be made well aware of the fact that their gaming experience is not an RNG predetermined win or loss, but an intricate interplay of their own luck coupled with their decision to risk current winnings to potentially unlock even greater rewards.

Risk vs. Reward Playfield

Players insert cash, coins, credit cards, redeemable tickets or vouchers into the machine to fund a Credit Bank. Players then determine the number of credits they wish to bet on the game (i.e., minimum 1 credit, maximum 5 credits). The more credits that players wager, the greater the potential rewards. The legend and status and information areas display the rewards available in the game as well as the number of selections players will receive based upon their wager. The number and distribution of selections may be randomly provided, and the order of use of the selections may be required to be exercised in a specific order or may be chosen by the player. After the amount of the wager is selected and entered (committed to play), the Play button is pressed to begin the game. At this time a first set of selections of the two categories is provided. Players may be first prompted to make a quantity of SAFE selections from the playfield based upon their wager. These initial selections are considered SAFE as they cannot negatively impact the results of the game, that is the player cannot lose all or even some of the amount wagered.

If the selection is to be made automatically and randomly by the processor, a Confirm button is pressed to reveal the SAFE selections on the series of panels or frames provided on the screen. The legend and status and information areas are updated to reflect the results of the revealed SAFE selections. Players are then prompted to either press the Collect button to receive their winnings (if any) and end the game, or continue playing the game by making at least one RISK selection, which can negatively impact the results of the game.

If players choose to continue playing, a single RISK selection is made from the playfield and the Confirm button is pressed to reveal the RISK selection. If a game terminating event has not been triggered, the legend and status and information areas are updated to reflect the results of the revealed RISK selection. Players are once again prompted to either press the Collect button to receive their winnings (if any) and end the game, or continue playing the game by making another RISK selection. This process continues until players press the Collect button, trigger a game ending event, or exhaust their number of remaining RISK selections. Based upon the outcome, status, and odds, players may be offered the opportunity to purchase additional SAFE and/or RISK selections to continue playing the game. Players may not purchase only additional SAFE selections and when multiple, additional selections are purchased (with a combination of SAFE and RISK selections), at least one selection of each category of selection must be exercised or all selections must be exercised. Even if the program allows for use of the SAFE selection as a first selection among the purchased (or awarded) additional selections, there can be no COLLECT entry until at least one or an equal number or all RISK selections have been exercised. Otherwise, players are awarded their winnings (if any) and the entire playfield is revealed. Players may then determine the number of credits they wish to bet on the next game or cash out.

Game Instructions (as they May be Physically Viewed on Game Console):

1. Insert cash, coins, ticket, voucher, etc.
2. Place your bet and press PLAY or BET MAX.
3. Make SAFE selections from playfield (Press RANDOM for random selections).
4. Press CONFIRM to reveal SAFE selections.
5. Press COLLECT to end game and collect winnings or make a RISK selection from playfield (Press RANDOM for random selection).
6. Press CONFIRM to reveal RISK selection.
7. Good Luck!

Video Poker Playfield Variant with "Bonus Attachments"

Players insert cash, coins, credit cards, redeemable tickets or vouchers into the machine to fund the Credit Bank. Players then determine the number of credits they wish to bet on the game (i.e., minimum 1 credit, maximum 7 credits). Betting 1-5 credits plays standard video poker, while betting a side bet or at least one additional credit or for example a total of 6-7 credits invokes the "bonus attachment" feature. After the wager is selected, the Play button is pressed to begin the game. Players are prompted to select 5 cards from the play-field. The Deal button is pressed to reveal the selected cards. Players choose which cards (if any) to HOLD in their hand by selecting each card to keep. The Discard button is pressed to remove the unselected cards from the hand. Players are prompted to select the same number of discarded cards from the playfield. The Draw button is pressed to reveal the selected cards. Based upon the outcome and odds, players may be offered the option of purchasing the opportunity to re-select at least one of their draw cards from a reshuffled playfield. Otherwise, winning hands are paid according to the pay table and the entire playfield is revealed. Players may then determine the number of credits they wish to bet on the next game or cash out.

If the "bonus attachment" feature is invoked, bonuses including credit multipliers, bonus games, and instant win prizes may be "attached" to either specific cards or locations on the playfield. Revealing a "bonus attachment" entitles players to receive the bonus reward as long as the card to which the bonus is "attached" remains in the final winning hand. In other words, cards with "bonus attachments" that are discarded do not result in a bonus award, and cards with "bonus attachments" remaining in final hands that are not listed as winning hands in the pay table also do not result in a bonus award.

Game Instructions (as they May be Physically Viewed on Game Console):

1. Insert cash, coins, ticket, voucher, etc.
2. Place your bet and press PLAY or BET MAX.
3. Select 5 cards from playfield or press RANDOM for randomly selected cards.
4. Press DEAL to place selected cards in hand.
5. Select cards to HOLD in hand.
6. Press DISCARD to remove unselected cards from hand.
7. Select draw card(s) from playfield or press RANDOM for randomly selected card(s).
8. Press DRAW to place selected cards in hand.
9. Good Luck!

Purchaseable Additional Selections

Another format of play within the concepts of the present technology is the ability to purchase additional selections or groups of selections during play. This feature can be described as a method of providing a wagering game on a video wagering system. A player places value at risk in exchange for a first number of player usable selections. The selections comprise two categories of selections, a first category of selection having a first effect upon at least some selection results and a second category of selection having a second effect upon at least some selection results. The player exercises at least some but less than all selections of frames to reveal at least one symbol for each selection made, symbols being able to provide a player with potentially positive award results, positive award results, potential negative results, negative results or neutral results. After exhausting the first number of selections, the player has the opportunity to make and may make an election to purchase or not to purchase at least one additional selection. As with the underlying technology described above, at least the first effect of the first category of selection can at least reduce a negative effect or potential negative effect by at least some degree. A first set of at least one additional selection that can be purchased may or must include at least one selection that is not a first category of selection. The first set of additional selections preferably includes both a first category of selection and at least one second category of selection. It is a preferred embodiment of play that all selections in the first set of additional selections must be exhausted before the player can elect to resolve all wagers. It is another embodiment of play that at least one selection from the first category and at least one second category of selection before the player can elect to resolve all wagers.

Multiple Game Play Variations

The game play format of the present invention offers a significant opportunity for providing multiple formats of play at the same time. While most video games having a limited number of reels and pay lines available, the present system of pick-and-reveal symbol display allows for the system to operate by providing separate game play symbol collection areas on the screen, with multiple games being played at the same time. This is shown clearly in the screen shot 2 of FIG. 1.

In that game play variation, there can be seen at least ten different games being played at the same time. The games may be elected for play by the player or may be automatically played by every player. On the right side of the screen shot 2 are shown ten different tally sets for scoring different games that may be played one-at-a-time or in groups or all at one time in the play of the system of the present technology. The number of credits wagered may be one basis for determining how many games are played at any time, selecting different games and different numbers of games may control or influence how many original selections are provided (e.g., when playing fewer games, more selections would be provided, and when selecting more games, fewer original selections would be provided). In a preferred mode, all games are played every time the system is played or at least every time the maximum number of credits is played. For example, None or fewer than all of the three progressive jackpots shown in tallies 4, 6 and 8 may be played without at least some threshold minimum wager. For example, with a maximum wager (e.g., five credits) or a maximum wager plus a bonus wager (e.g., five credits then an additional one credit, for six credits total, with only the five credits used as the basis for any multiplied winning or odds on payouts), the player may have all three progressive jackpots 4, 6 and 8 in play. It may be a format of play that with a maximum wager, only the Mini-Pot 8 is engaged, and with one additional credit the Midi-Pot 6 is engaged, and with two additional credits the Mega-Pot 4 is engaged, or with at least three maximum wagers, or at least three maximum wagers plus one additional credit, the Mega-Pot 4 is engaged. Different symbols are used to win these various jackpots and as each symbol is chosen, they are entered into the appropriate tally for a game in which the symbol is used.

Immediately below the three Jackpot tally frames 4, 6 and 8 is shown an Instant Cash play tally format 10. In the play of that game, numbers revealed from the revealed frames on the screen shot 2, the numbers are added in the order revealed into the frames of the tally form 10. The numbers may be added starting on the right or starting on the left of the frames, with zeros available for selection in the play of the game. There may be a requirement that at least a minimum total value be accumulated in the play of this game before the award is collectable. For example, the total may have to be at least $2.00 or at least $1.00 to be collectable, or the listed amount (e.g., $0.90) would not be added to the credits.

Immediately below the Instant Cash tally form 10 is shown three basic bonus games 12, 14 and 16 in which free spins, credit awards, or entry into a bonus round may be achieved by collection of symbols that fill the frames of these tally forms 12, 14 and 16. Different size prizes are provided for different numbers of symbols or different probabilities for the symbols.

Immediately below the Bonus Games tally forms 12, 14 and 16 are shown three Match & Win tally forms 18 20 and 22 which provide specific awards for these preferably higher frequency symbols. In addition to normal symbol selections filling the frames in the Match & Win game, Wild Symbols may be available on the screen. The Wild Symbols may be used in all games, but preferably are used in only the lower payout games, and especially only in the Match & Win game. If there are enough Wild Symbols available in the screen shot 2 to have any significant frequency of play and provide interest to the player, it is preferable that those symbols be used only in the lower payout games, or the frequency of the complimenting higher payout award symbols (such as those used in the Progressive Jackpot tallies 4, 6 and 8) would have to be reduced to retain a reasonable frequency of winning events in the larger value games.

One description for the play using this multiple game format would be as a method of providing a wagering game on a video wagering system. A player places value at risk in exchange for a first number of player usable selections. The selections comprise two categories of selections, a first category of selection having a first effect upon at least some selection results and a second category of selection having a second effect upon at least some selection results. The player exercises at least some but less than all selections of frames to reveal at least one symbol for each selection made, symbols being able to provide a player with potentially positive award results, positive award results, potential negative results, negative results or neutral results. Winning event combinations available from revealed symbols comprise at least two different bases of winning selected from the group consisting of:

a) a first jackpot won by providing a specific combination or sequence of a first set of at least five symbols;

b) a second jackpot, smaller in size than the first jackpot won by a specific sequence or combination of second set of at least four symbols, but fewer than a number of symbols needed in the first set to win a largest amount in the first jackpot; and c) a sequence of numbers that are inserted into a series of blank frames and the numbers accumulating into a winning amount.

At least the first effect of the first category of selection can at least reduce a negative effect or potential negative effect by at least some degree.

The other elements of play of the pick-and-reveal technology described herein are also preferably used in the practice of this multigame play format.

In the play of this method format, it may be desirable to require that the sequence of numbers accumulating into a winning amount must exceed a minimum value amount or a minimum number of integers to provide an award. The method may be played with available winning combinations of all of a), b) and c) in the play of the game. At least one jackpot of a) and b) may provide words or letters as the symbols. To promote purchase of additional selections, the first number of player usable selections is usually exactly equal in number or less than a number of symbols needed to win a largest amount in the first jackpot.

The screen may also be populated with non-selectable frames 24 to adjust probabilities and give an attractive appearance to the screen. The non-selectable areas may remain the same or change from game to game.

Numerous other features of play that may be used, for example, might include an Information/Stats button providing players with a detailed description of the quantity of each game symbol remaining in the game along with the overall odds of selecting a positive, negative, or neutral symbol. A Random pick button that automatically makes random selections for players when pressed. The random pick button may be pressed repeatedly to randomly reselect from the playfield. There may be a Confirm button to serve as final confirmation of selections made by player. The ability to purchase additional selections may and should be limited by the outcome, status, and odds, the opportunity for players to purchase additional SAFE and/or RISK selections to continue playing the game. It may be possible early in the play of the game to purchase a few (one or even two) SAFE selections, without also purchasing attendant RISK selections, but this is less preferred. Additionally, there must be a limit to the number of SAFE selections (only) that may be purchased at any time, and although the game ending events that occur can place an inherent limit on the total number of all selections that may be purchased, it is desirable to place a limit on that total number of selections in the game play rules. It is also possible to provide the player with the opportunity to exchange SAFE selections for a larger quantity of RISK selections.

Game play may use a “Double-tap” method of making selections from the playfield by pressing the screen once to highlight a selection followed by a required second press to confirm the selection. In traditional Keno formats, it is typical to press a selection and erase the selection by a second tap to the screen. This is acceptable, as Keno must select a minimum number of squares (numbers) that are already displayed, and the processor generators randomly selects squares in a virtual “drawing” of numbers, so that all player selections must be present on the screen at the time of the drawing. At the conclusion of the game of the present technology, it is also possible to reveal of the entire playfield allowing players to see the exact location of every game symbol at the end of the game.

Game Play and Especially Video Poker Playfield Variant with “Bonus Attachments” Potential Novel Concepts In the play of this format, especially where a number (at least one) symbol that has been revealed may be discarded and replaced, there is another novel feature in the play of the present technology that can be practiced. In a game where at least one symbol may be replaced by a discard and draw feature (e.g., selecting another frame to reveal another symbol), Bonus Attachments may be randomly provided to one or more symbols that are available for selection. These bonus symbols may provide a multiplier for any wins achieved, provide a multiplier for any wins achieved with fewer than X numbers of selections having been made, provide a free additional selection in a next game (not in the present game as that would negate the possibility of replacing the symbol with the bonus attachment), and the like.

When a player reveals a symbol with the bonus attachment thereon, the player is then faced with a choice, depending upon other symbols available. For example, if the player has attained a small win and the bonus attachment is a multiplier, and the likelihood of selecting a replacement symbol that would increase the existing multiplied award is small, the Player would likely keep the bonus attachment, even if that symbol with the attachment does not directly contribute symbols that provide the award. For example, in a poker game, if the five cards revealed were a pair of Queens, a four, a six, and a 9 (with a bonus 3× multiplier attached thereto), the theoretical best result a player could get by discarding the 9 only would be to get another Queen, which would only give the player a typical 3× reward for Three-of-a-kind, the player would elect to keep the 9 with the bonus attachment and replace as many of the other non-Queen cards.

In an alternative situation, where a player has K-Q-J-10 in suit and a Q with a 2× bonus attachment associated with it, the math becomes quite different for influencing retention or discarding of the bonus attachment. The typical award for a Pair of Queens would be 1× the wager, plus the 2× bonus attachment. However, the award for a same suited card as the K-Q-J-10 is typically 5×, the award for a different suited 9 or Ace is typically 4×, and the award for a same suited 9 is typically 200× and a same suited Ace is typically 1000×. With these much higher potential payouts for available replacement cards, the player would likely then discard the bonus attachment card and seek a replacement card, sacrificing a small win (2×) for the potential of many more larger wins.

In the play of this format of game, it would be typical to populate the entire deck of cards on a playfield from which selections are made by player. A Random Number Generator (RNG) would populate all cards across the playfield prior to player selection or the RNG would provide a template that would be selected in the next series of selections, without regard to what actual frames were selected. There could be a random pick button that automatically makes random selections for player when pressed. The random pick button may be pressed repeatedly to randomly reselect from the playfield. There would also be a confirm button to serve as final confirmation of card selections made by player. Based upon the outcome and odds, which may be displayed on the screen, including an actual statement of the probabilities of improvement and the statistical analysis of the benefit or disincentive for one or more replacements, the player may exercise the option to purchase the opportunity to re-select their draw cards from a reshuffled playfield.

Bonuses that may be "attached" may include, by way of non-limiting examples in addition to those already described, credit/award multipliers, bonus games, and instant win prizes. These may be "attached" to either specific cards or locations on the playfield. "Attached" bonuses are awarded for cards displaying "bonus attachments" that appear only in final, winning hands.

A Credit multiplier "bonus attachment" may be one or more credit multiplier "bonus attachments" appearing in the final winning hand that are added together, resulting in the credit multiplier value which is applied to the credits awarded for the winning hand as defined in the pay table. A Bonus game "bonus attachment" is a separate bonus game that is launched after the winning hand payout provided a card with the bonus game "attachment" appears in the final winning hand.

An Instant win prize "bonus attachment" is an instant prize award or prize selection opportunity that is launched after the winning hand payout provided a card with the instant win prize "attachment" appears in the final winning hand.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Many variations may be effected in the practice of the present technology. For example, although the practice of the technology has been emphasized as an electronic game or even a live card game, it may be played as a TV Game Show or live game show.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed:

1. A method of providing a wagering game on a video wagering system comprising a gaming system comprising a processor, player input controls, a video display and game control software in which the video display provides selectable areas, and in which player input controls allow selection of individual selectable areas by input at the player input;

the method comprising steps of:

the processor recognizing value at risk entered at the player input in exchange for a first number of player input usable selections provided by the processor;

the selections comprising two categories of selections, a first category of selection having a first effect upon at least some selection results and a second category of selection having a second effect upon at least some selection results;

the processor recognizing player input exercising at least some but less than all player input usable selections of frames to reveal at least one symbol for each selection made, symbols being used by the processor to provide potentially positive award results, positive award results, potential negative results, negative results or neutral results;

at least the first effect of the first category of selection can at least reduce a negative effect or potential negative effect by at least some degree;

wherein the processor identifies player input action making an election to forfeit at least one player input usable selection after the processor has received at least some of the player input usable selections, whether or not an award has been accumulated; and wherein the processor allows input with respect to only a number of selections fewer than a total number of frames from which selections may be made from the player input, wherein there are at least ten frames from which selections may be made from the player input, and the processor allows input from the player input of at least two selections and at least one selection is a first category of selection and at least one selection is a second category of selection.

2. The method of claim 1 wherein a selection of a negative effect is received by the processor and the first effect nullifies the negative effect completely.

3. The method of claim 1 wherein a selection of a negative effect is received by the processor and the first effect reduces the negative effect by a fixed degree.

4. The method of claim 1 wherein after making at least one selection, the processor recognizes that player input has forfeited at least one additional selection.

5. The method of claim 1 wherein all first category of selections must be used before any of the second category of selections are exercised.

6. The method of claim 1 wherein the processor recognizes player input of the category of selection used on each selection.

7. The method of claim 1 wherein at any time during play, if the processor recognizes that a player has accumulated an award amount, the processor acknowledges a signal from the player input to forfeit any remaining second category selections and retain all award amounts accumulated at that time.

8. The method of claim 1 wherein the second category of selections has no impact on any effects of selections.

9. The method of claim 1 wherein there are at least 25 frames and the processor allows player input of at least five selections and at least one selection is a first category of selection and at least one selection is a second category selection.

10. The method of claim 9 wherein there are at least 50 and no more than 150 frames which may be allowed by the processor for selection from the player input.

11. The method of claim 1 wherein a selection made from the first category of selections causes the processor to reduce the negative impact of a later selection in the first category of selections.

* * * * *